(12) United States Patent
Sato

(10) Patent No.: US 7,746,326 B2
(45) Date of Patent: Jun. 29, 2010

(54) COORDINATE INPUT APPARATUS AND ITS CONTROL METHOD

(75) Inventor: Hajime Sato, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 920 days.

(21) Appl. No.: 11/179,747

(22) Filed: Jul. 13, 2005

(65) Prior Publication Data
US 2006/0012579 A1    Jan. 19, 2006

(30) Foreign Application Priority Data
Jul. 14, 2004  (JP)  ............... 2004-207607

(51) Int. Cl.
*G06F 3/041* (2006.01)
(52) U.S. Cl. .................... 345/173; 178/18.01
(58) Field of Classification Search ................ 345/163, 345/169–178, 179, 180, 182, 183; 178/18.01
See application file for complete search history.

(56) References Cited

U.S. PATENT DOCUMENTS

| | | | |
|---|---|---|---|
| 5,684,277 A | | 11/1997 | Tokioka et al. |
| 5,691,748 A | * | 11/1997 | Fukuzaki ............ 345/173 |
| 5,744,760 A | | 4/1998 | Kobayashi et al. |
| 6,255,604 B1 | | 7/2001 | Tokioka et al. |
| 6,335,723 B1 | * | 1/2002 | Wood et al. ......... 345/173 |
| 6,384,814 B1 | | 5/2002 | Kobayashi et al. |
| 6,563,491 B1 | * | 5/2003 | Omura ............... 345/173 |
| 7,161,578 B1 | * | 1/2007 | Schneider .......... 345/156 |
| 2002/0163505 A1 | * | 11/2002 | Takekawa ........... 345/173 |
| 2006/0125579 A1 | | 1/2006 | Sato |

FOREIGN PATENT DOCUMENTS

| | | |
|---|---|---|
| JP | 06-035923 | 2/1994 |
| JP | 11-65766 | 3/1999 |
| JP | 2001-084107 | 3/2001 |
| JP | 2003-186616 | 7/2003 |
| JP | 2003-303046 | 10/2003 |
| JP | 2003-308164 | 10/2003 |
| JP | 2003-345505 | 12/2003 |

* cited by examiner

*Primary Examiner*—Amare Mengistu
*Assistant Examiner*—Vinh T Lam
(74) *Attorney, Agent, or Firm*—Fitzpatrick, Cella, Harper & Scinto

(57) ABSTRACT

A coordinate input apparatus is provided. A photo transmission/reception unit includes a phototransmitter which projects light along a plane of an input region, and a photoreceptor which detects incoming light. A reflector is arranged on a rim portion of the input region, and reflects incident light from the phototransmitter toward the photoreceptor. A detection unit detects a shade formed by the pointing operation of a pointing device using the photo transmission/reception unit. And an output unit calculates a coordinate value of the position based on a state of the detected shade, and outputs information of the coordinate value. The pointing device includes a transmission unit configured to transmit a control signal including information of a unique identifier based on the pointing operation, and the output unit extracts the information of the identifier from the control signal transmitted based on the pointing operation associated with the shade, and appends the information of the coordinate value when that information is output.

9 Claims, 28 Drawing Sheets

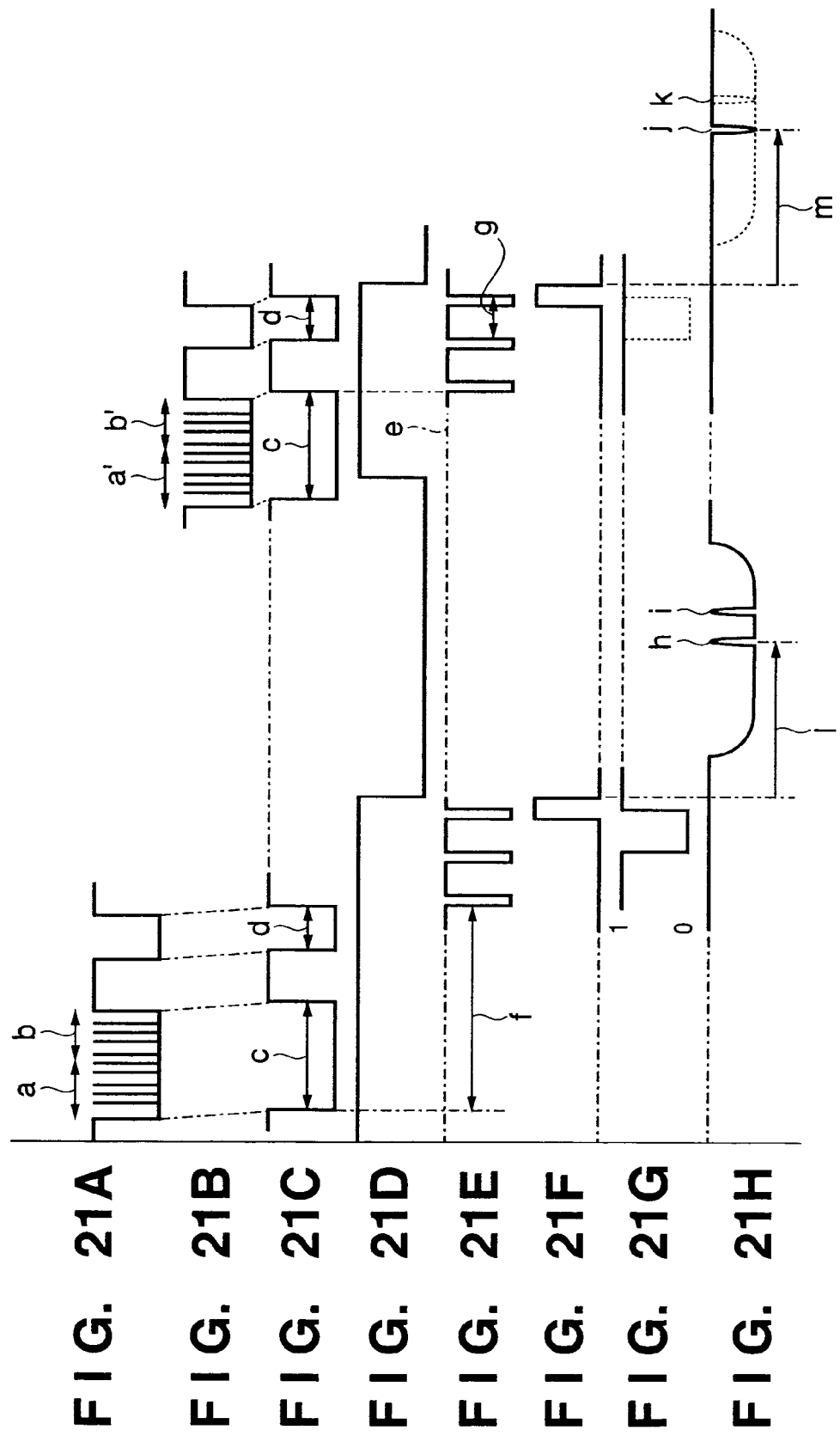

COORDINATE INPUT APPARATUS AND ITS CONTROL METHOD

FIELD OF THE INVENTION

The present invention relates to a coordinate input apparatus and its control method and, more particularly, to a coordinate input apparatus and its control method which is used to control a connected computer or to write characters, graphics, and the like by inputting coordinates in an input region using a pointing device.

BACKGROUND OF THE INVENTION

Conventionally, as an apparatus of this type, touch panels of various methods have been proposed or are commercially available. Such touch panels are prevalently used since they allow easy operation of a personal computer (PC) on the screen without using any special tool or the like.

Various methods such as a method using a resistor membrane or an ultrasonic wave, and the like are available. As an apparatus using light, as disclosed in Japanese Patent Laid-Open Nos. 2001-84107, 2003-186616, and the like, there are provided apparatuses which detect the angle of a region which is shielded by a finger or the like in the input region, and detect the coordinates of the light-shielded position, i.e., input position in the arrangement in which a recurrent reflector is arranged around a coordinate input region, light coming from photo transmission means is reflected by the recurrent reflector, and a light amount distribution is detected by photo reception means.

These apparatuses aim at providing a coordinate input apparatus that allow a plurality of operators to make inputs. For example, Japanese Patent Laid-Open No. 2001-84107 describes the following contents. That is, an apparatus has angle detectors each of which cyclically detects a point designated on an input region by pointing means as an angle, and comprises an angle memory for storing an angle detected in the previous cycle, an angle selector for, when the number of detected angles in the current detection is larger than that in the previous detection, selecting an angle closest to the angle stored in the angle memory from the angles detected in the current detection, and a coordinate calculator for detecting coordinates on the basis of the selected angle. When the number of currently detected angles is larger by one than the number of previous detected angles for each angle detector, coordinates input by another pointing means are detected from the angle which is not selected by the angle selector. This apparatus also has identifier assignment means which can assign an identifier of the pointing means to coordinates to be output. When coordinates are to be output to a computer or the like, two coordinate positions designated by two pointing means can be identified from each other.

Japanese Patent Laid-Open No. 2003-186616 describes the following contents. That is, when two predetermined objects are simultaneously inserted onto an information input region, four two-dimensional position coordinate values are calculated except for a special case. The angles of light beams coming from photo transmission means, which are shielded or reflected by the predetermined objects that pointed the information input region, are calculated, and two two-dimensional position coordinate values actually pointed by the two predetermined objects are determined from the four calculated two-dimensional position coordinate values on the basis of the calculated angles. Furthermore, the arrangement has means for assigning different identification numbers to the two-dimensional position coordinate values calculated first. It is determined to which of the previously calculated two-dimensional position coordinate values each of the two two-dimensional position coordinate values which are kept calculated is closer, and the identification number of the previously calculated two-dimensional position coordinate value which is determined to be closer is kept assigned.

In the aforementioned apparatus, the pointing means is a finger or a pen-shaped pointing device. The coordinate input apparatus of this type is configured to control an application by pointing (touching) the screen. The pen which forms the above apparatus cannot transmit any commands for controlling a computer by itself, and has many restrictions upon operation of an application on the computer, thus causing problems in terms of functions. Hence, such pointing means is not always convenient.

On the other hand, upon operation of an application on the computer, functions corresponding to left clicking, right clicking, and the like as mouse functions are indispensable. An apparatus that allows various operations depending on how to touch so as to implement these functions is known. For example, this apparatus implements functions by so-called gesture input operations or the like by means of touch intervals and input traces. However, it is troublesome for the operator if he or she must learn gesture commands, and cannot operate intuitively. Hence, the operability is not so good as in the above case.

In order to allow inputs by a plurality of operators, attributes corresponding in number to input pointing means must be appended to coordinate values to be output to the computer side when the coordinate values are output. More specifically, in order to display the coordinate values input by each pointing means as a continuous input trace for that pointing means, the computer must recognize the pointing device that input the coordinate values.

As the apparatus corresponding to the above description, each of Japanese Patent Laid-Open Nos. 2001-84107 and 2003-186616 described above discloses the arrangement of a coordinate input apparatus which allows inputs by a plurality of operators. As identification numbers to be assigned to coordinate values input by the plurality of operators, different identification numbers are assigned in turn to those which are input earlier, and the same identification numbers are kept assigned to coordinate values which have closer distances to immediately preceding coordinate values. The identification number is kept assigned to the coordinate values of each pointing device until all inputs disappear.

However, with this arrangement, while the continuity of the trace after input can be assured, the attribute of the coordinate value input first cannot be determined.

Therefore, it is impossible to assign the attribute of the pen itself to the coordinate values to be output. A trace can be drawn during continuous input. However, since the identification number is cleared once the touch operation is completed, the functions of an application cannot be fully used. For example, problems are posed in operations when the operator wants to change a mode by pressing once an icon used to change a color, thickness, graphic, or the like as an operation for changing the line type or shape of drawing during input. That is, inputs using a plurality of pens are allowed, but combinations of pointing devices used to input and commands cannot be determined. Hence, processes corresponding to the attributes of pointing devices cannot be done.

Therefore, in order to use an application on the computer by a plurality of operators with high operability, unique attributes of pointing devices of the operators must be assigned to a plurality of input coordinate values.

SUMMARY OF THE INVENTION

In one aspect of the present invention, a coordinate input apparatus includes a photo transmission/reception unit having a phototransmitter which projects light along a plane of an input region, and a photoreceptor which detects incoming light; a reflector which is arranged on a rim portion of the input region, and configured to reflect incident light from the phototransmitter in the photo transmission/reception unit toward the photoreceptor in that photo transmission/reception unit; a pointing device used to make a pointing operation for pointing an arbitrary position in the input region; a detection unit configured to detect a shade formed by the pointing operation of the pointing device using the photo transmission/reception unit; and an output unit configured to calculate a coordinate value of the position on the basis of a state of the detected shade, and outputs information of the coordinate value, wherein the pointing device includes a transmission unit configured to transmit a control signal including information of a unique identifier based on the pointing operation, and the output unit extracts the information of the identifier from the control signal transmitted based on the pointing operation associated with the shade, and appends the information of the coordinate value when that information is output.

The above and other objects and features of the present invention will appear more fully hereinafter from a consideration of the following description taken in connection with the accompanying drawings wherein one example is illustrated by way of example.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 11 is a graph showing an example of the light amount distribution of the sensor unit output when an input is made by a finger or the like;

FIGS. 21A to 21H are timing charts of control signals and CCD detection signals when a plurality of pointing devices are used;

DESCRIPTION OF THE PREFERRED EMBODIMENTS

Preferred embodiments of the present invention will be described in detail in accordance with the accompanying drawings. The present invention is not limited by the disclosure of the embodiments and all combinations of the features described in the embodiments are not always indispensable to solving means of the present invention.

(Schematic Arrangement of Coordinate Input Apparatus)

Figure 1A:
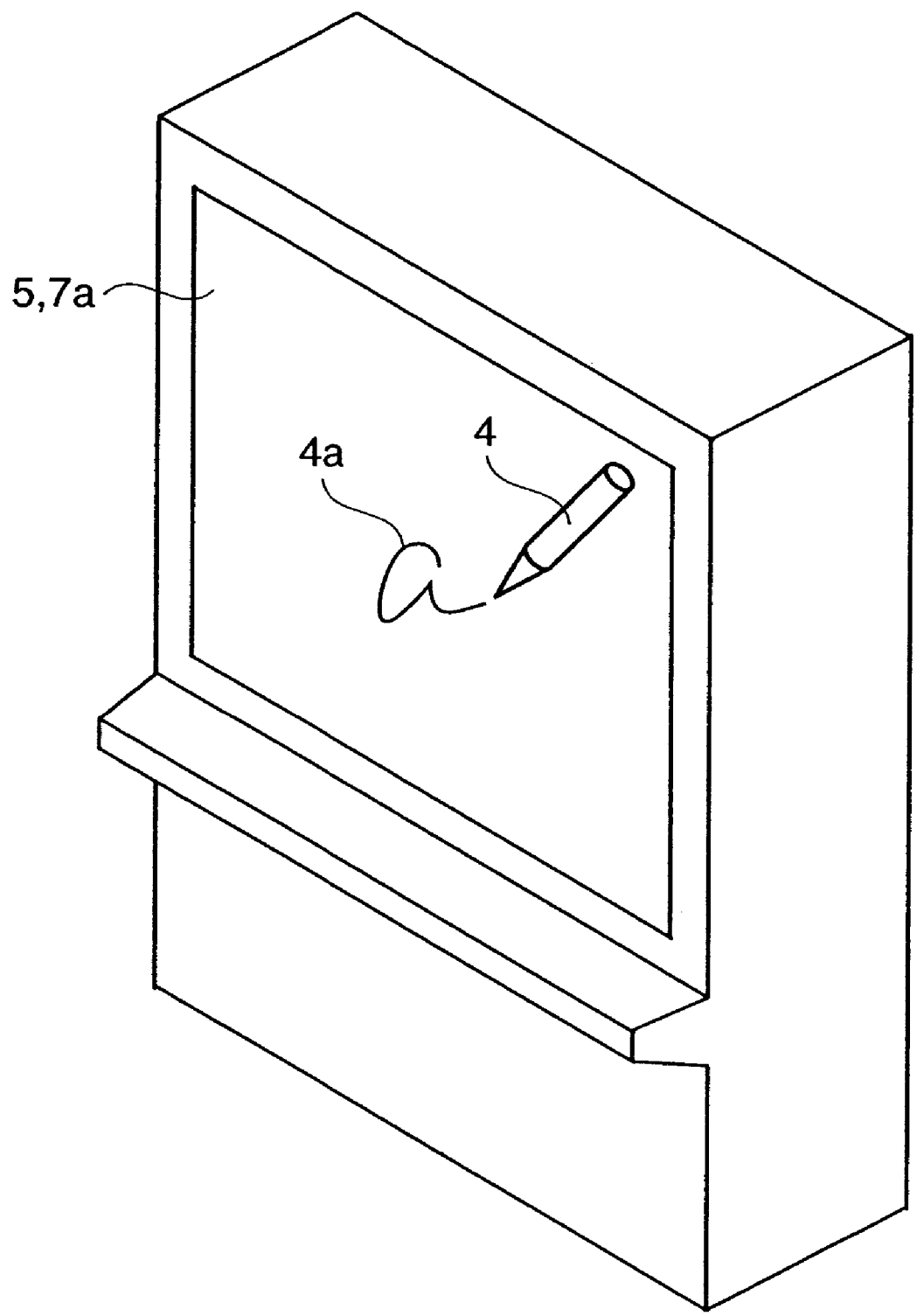
FIG. 1A is a perspective view showing the outer appearance of an image display/input unit of an information processing system according to an embodiment of the present invention.
Figure 1B:
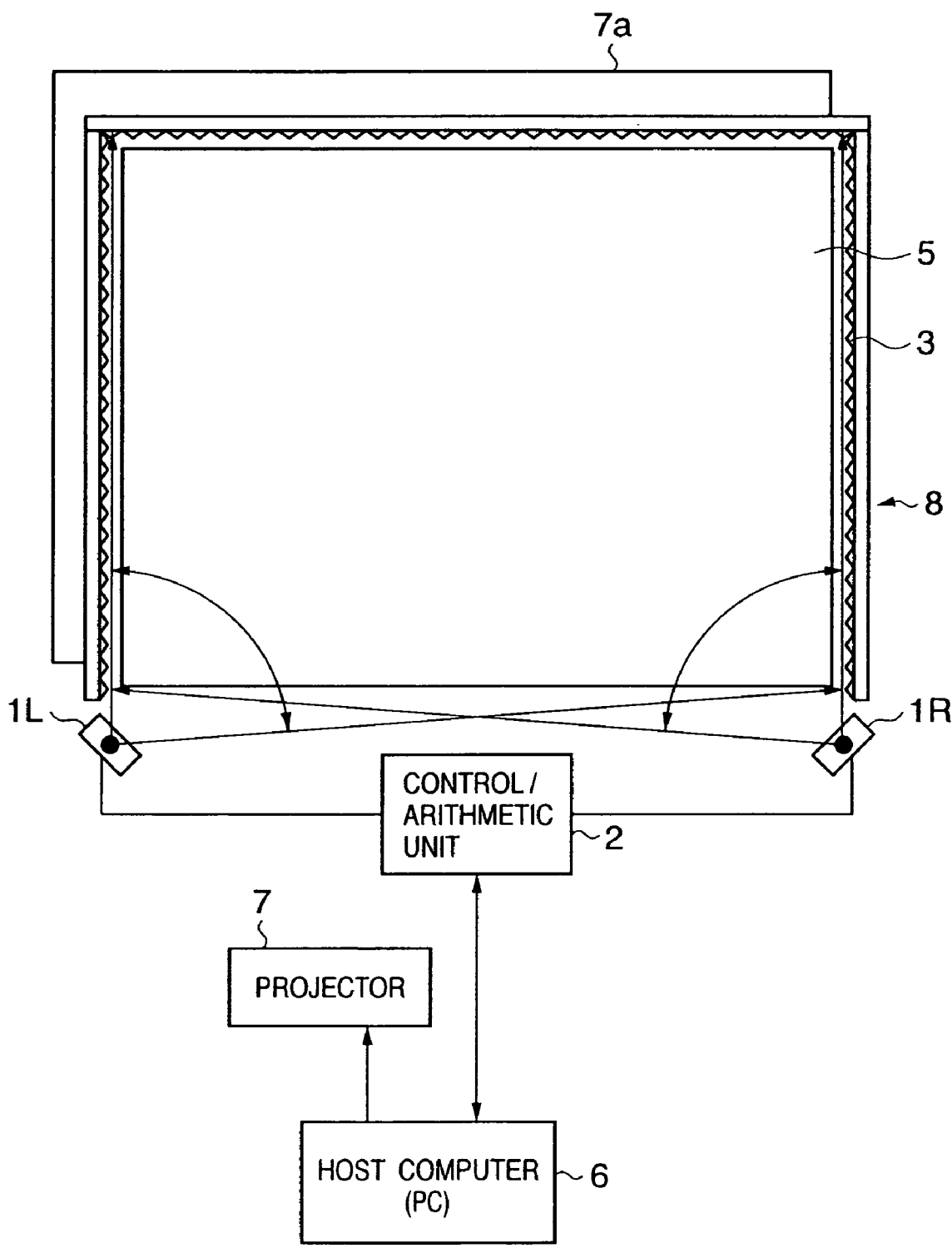
FIG. 1B is a schematic block diagram showing the hardware arrangement of the information processing system according to the embodiment of the present invention.

A schematic arrangement of an information processing system according to this embodiment will be explained first using FIGS. 1A and 1B. FIG. 1A is a perspective view showing the outer appearance of an image display/input unit of the information processing system of this embodiment, and FIG. 1B is a block diagram showing the hardware arrangement of this information processing system.

This information processing system has an arrangement including a projector 7 as a display apparatus for displaying an image, a coordinate input apparatus 8 arranged on an image display screen 7a of this projector 7, and a host computer 6 serving as a control apparatus (host) which is connected to the projector 7 and coordinate input apparatus 8, and controls them. The host computer 6 is implemented by, e.g., a personal computer (PC). Therefore, the projector 7 and coordinate input apparatus 8 can be connected to the host computer 6 via interfaces such as USB or the like, respectively.

Figure 2:
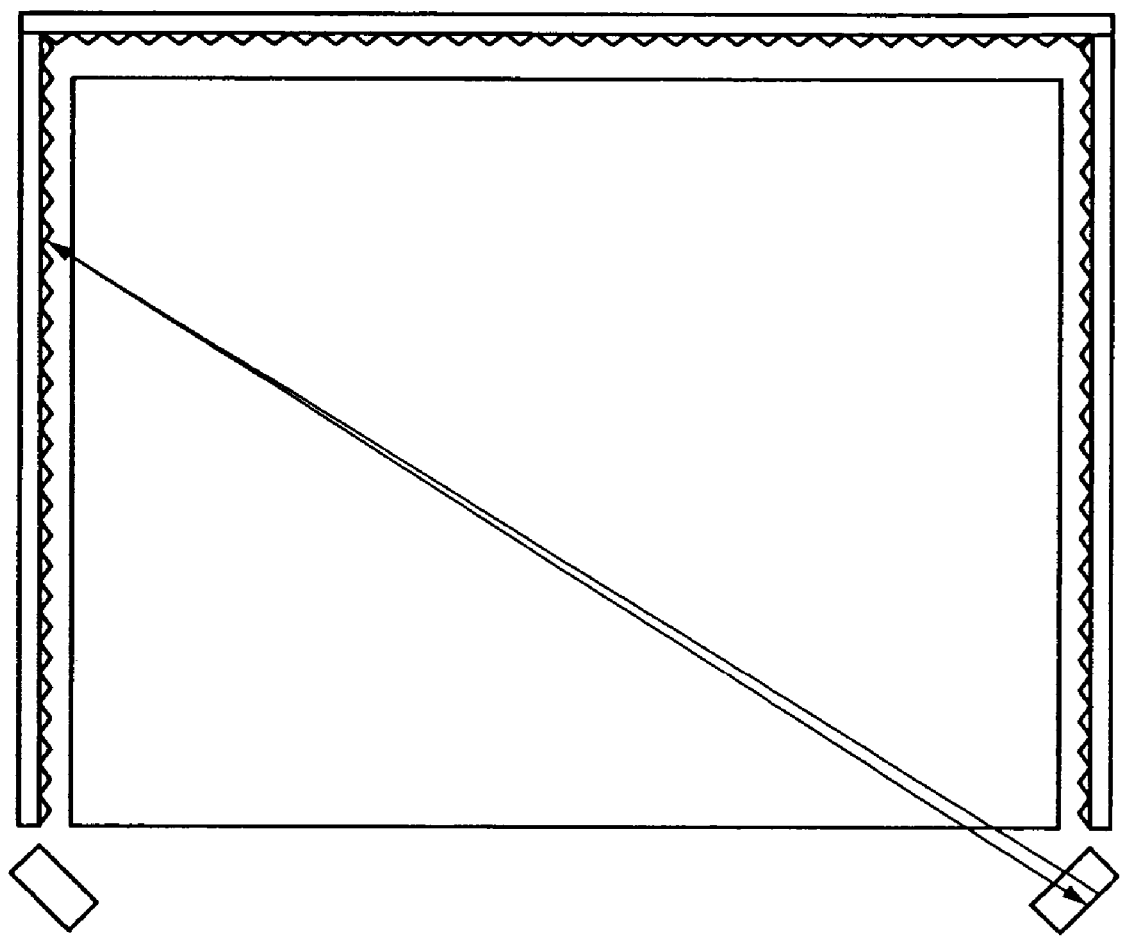
FIG. 2 is a view for explaining the function of a reflector according to the embodiment of the present invention.

The arrangement of the coordinate input apparatus 8 will be described below. Referring to FIG. 1B, reference numerals 1L and 1R denote sensor units each having a phototransmitter and photoreceptor. The sensor units 1L and 1R are set at positions spaced by a predetermined distance. The sensor units 1L and 1R are connected to a control/arithmetic unit 2 for making control and arithmetic operations, receives control signals from the control/arithmetic unit 2, and transmits detected signals to the control/arithmetic unit 2. Reference numeral 3 denotes a reflector having a recurrent reflection plane which reflects incoming light to the arrival direction, as shown in FIG. 2. The reflector 3 recurrently reflects light beams, which are projected from the left and right sensor units along the plane of an input region 5 within the range that covers the input region 5 (e.g., the range of about 90°), toward the sensor units. The reflected light is one-dimensionally detected by the photoreceptor of each sensor unit, which comprises a focusing optical system, line CCD, and the like, and its light amount distribution is sent to the control/arithmetic unit 2.

The input region 5 can be used as an interactive input device when it is formed on a display screen of a display apparatus such as a PDP, rear projector, LCD panel, or the like. In this system, when a predetermined pointing device 4 is pressed against the input region 5 and is moved, a trace 4a can be input. Also, when an instruction input is made to various kinds of information such as displayed icons and the like, various applications can be controlled.

With this arrangement, when an input instruction is made on the input region by the pointing device 4, a finger, or the like, light projected by each phototransmitter is shielded, and no reflected light of recurrent reflection is obtained. Hence, no light amount is obtained from only the input instruction position.

The control/arithmetic unit 2 detects a shade range of the input instruction portion on the basis of light amount changes of the left and right sensor units 1L and 1R, specifies a detection point within the range, and calculates respective angles. Then, the control/arithmetic unit 2 calculates a coordinate position on the input region 5 on the basis of the calculated angles, the distance between the sensor units, and the like, and outputs the coordinate value to the host computer 6.

In this way, the operations of the host computer 6 (e.g., drawing a line, operating icons, and the like on the screen) can be made by a finger or the like.

Respective units of the coordinate input apparatus 8 will be described in detail below.

(Detailed Description of Sensor Unit)

Figure 3A:
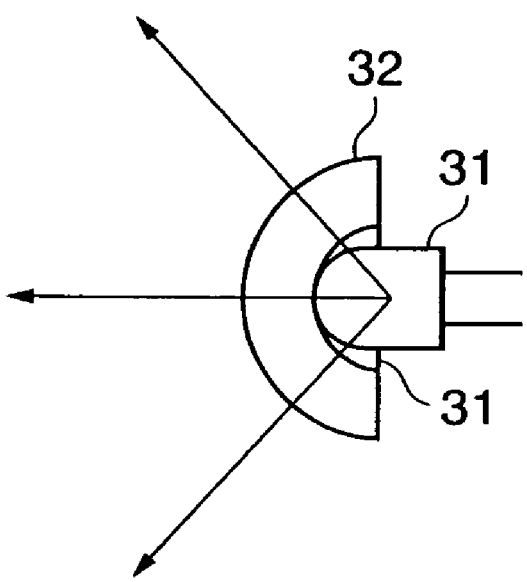
FIGS. 3A and 3B are views showing the arrangement of a phototransmitter according to the embodiment of the present invention.
Figure 3B:
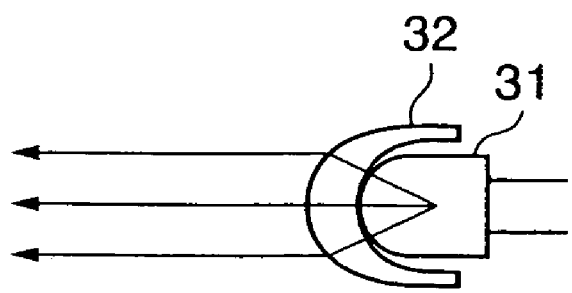

FIGS. 3A and 3B are views showing an example of the arrangement of the phototransmitter in each of the sensor units 1L and 1R. FIG. 3A is a top view of the phototransmitter (in a vertical direction to the input plane), and FIG. 3B is a side view of phototransmitter (in a horizontal direction to the input plane). Reference numeral 31 denotes an infrared LED which emits infrared light. The emitted light emanates in the range of about 90° via a projection lens 32. In this direction, light emitted by the infrared LED 31 is projected as a light beam which is limited in the up-and-down direction, and is mainly projected toward the reflector 3.

Figure 4:
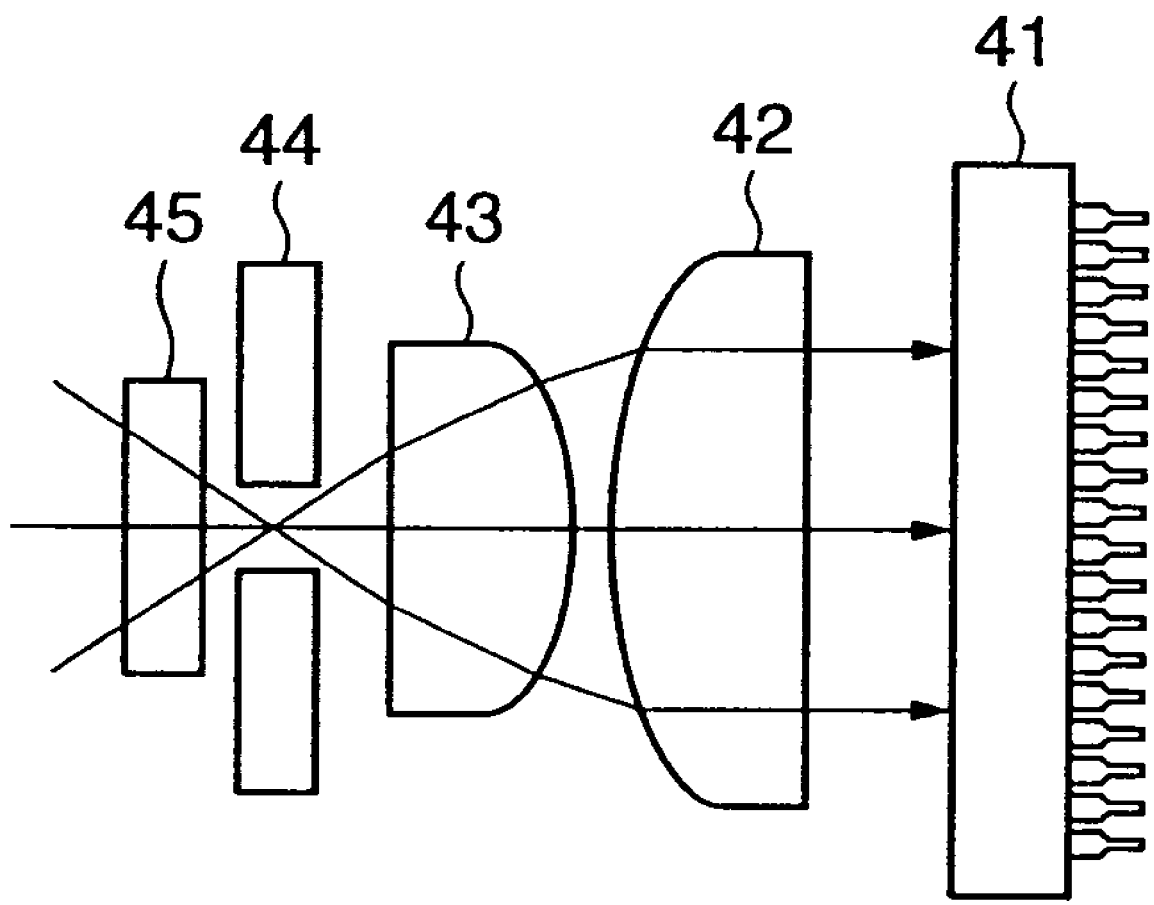
FIG. 4 is a view showing the arrangement of a photoreceptor according to the embodiment of the present invention.

FIG. 4 shows the photoreceptor in each of the sensor units 1L and 1R when viewed from the vertical direction to the input plane. The photoreceptor has a one-dimensional line CCD 41, lenses 42 and 43 as a collection optical system, a stop 44 that limits the incident direction of incident light, and an infrared filter 45 which prevents extra light such as visible light or the like from entering.

Light emitted by the phototransmitter is reflected by the recurrent reflector, and passes through the infrared filter 45 and stop 44. Then, the light within the range of about 90° of the input plane is focused by the focusing lenses 42 and 43 on pixels depending on the incident angles on the detection plane of the CCD 41, thus representing light amount distributions for respective angles. That is, each pixel number expresses angle information.

Figure 5:
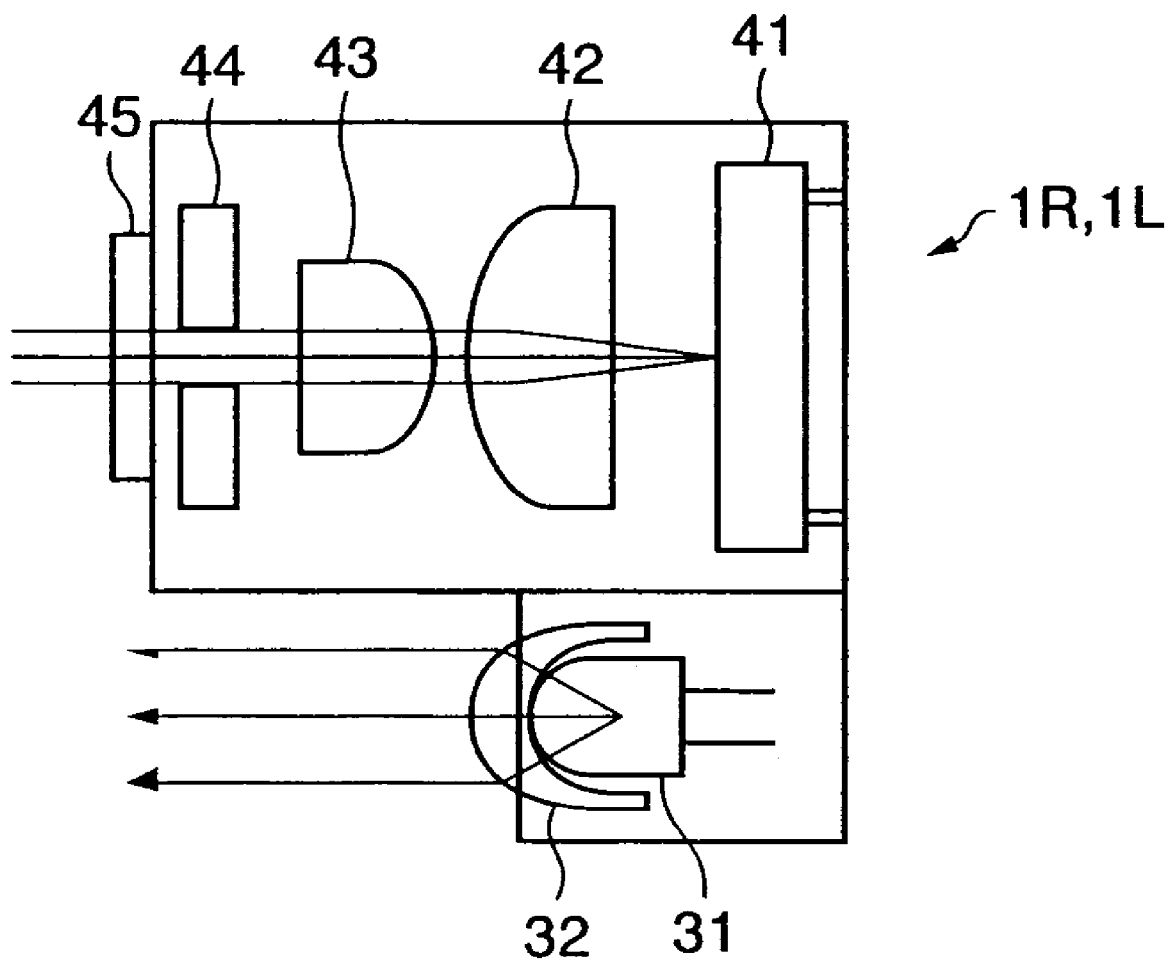
FIG. 5 is a view showing the arrangement of a sensor unit according to the embodiment of the present invention.

FIG. 5 shows the arrangement of each of the sensor units 1L and 1R when the input plane is viewed from the horizontal direction. As shown in FIG. 5, the phototransmitter and photoreceptor are stacked. The distance between the optical axes of the phototransmitter and photoreceptor can be set within a sufficiently detectable range on the basis of the angle characteristics of the recurrent reflector.

(About Reflector)

Figure 6:
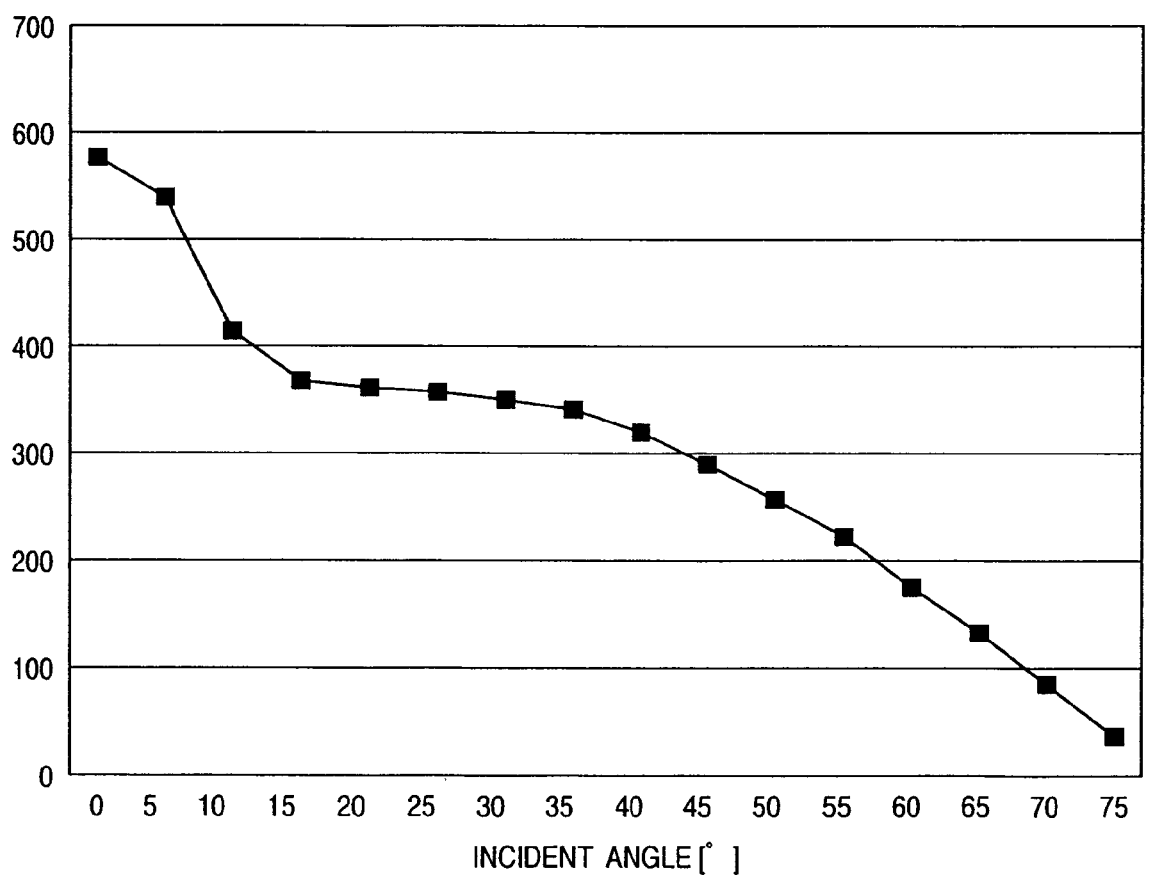
FIG. 6 is a graph showing an example of the characteristics of a reflected light amount with respect to an incident angle.

The recurrent reflector 3 shown in FIG. 1 has reflection characteristics with respect to the incident angle. As can be seen from the graph showing the characteristics of the reflected light amount with respect to the incident angle shown in FIG. 6, when the recurrent reflector 3 is formed flat, the obtained reflected light amount decreases from a position where the angle from the reflector exceeds 45°, and when a shield exists, the change cannot be sufficiently detected.

The reflected light amount is determined by the light amount distribution (the illumination intensity and distance), the reflectance of the reflector (the incident angle, the width of the reflector), and imaging system illuminance (the cosine law). When the light amount is insufficient, the illumination intensity may be increased. However, if the reflection distribution is not uniform, when light of an intense portion is received, the CCD as light-receiving means may be saturated at that portion; the illumination intensity has an upper limit. Put differently, an increase in incident light amount to a low light amount portion can be expected by setting the reflection distribution of the reflector to be as uniform as possible.

Figure 7:
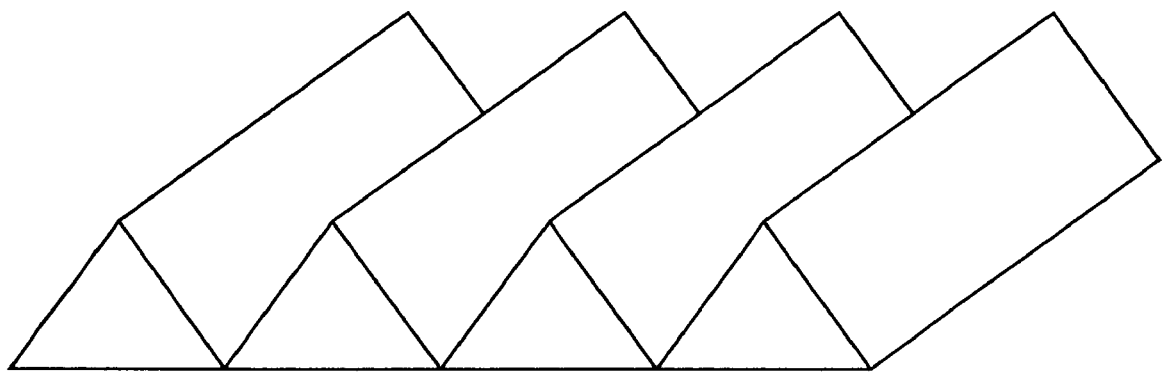
FIG. 7 is a view showing an example of the arrangement of an attachment member of a recurrent reflector according to the embodiment of the present invention.

In order to uniformize in the angle direction, a member to which the recurrent reflector 3 is to be adhered adopts a form defined by arranging triangular prisms, as shown in FIG. 7, and the recurrent reflector 3 is set on such member. With this arrangement, the angle characteristics can be improved. Note that the angle of each triangular prism can be determined from the reflection characteristics of the recurrent reflector, and its pitch is preferably set to be equal to or lower than the detection resolution of the CCD.

(Description of Control/Arithmetic Unit)

The control/arithmetic unit 2 and sensor units 1L and 1R shown in FIG. 1B exchange CCD control signals, CCD clock signals, CCD output signals, and LED drive signals.

Figure 8:
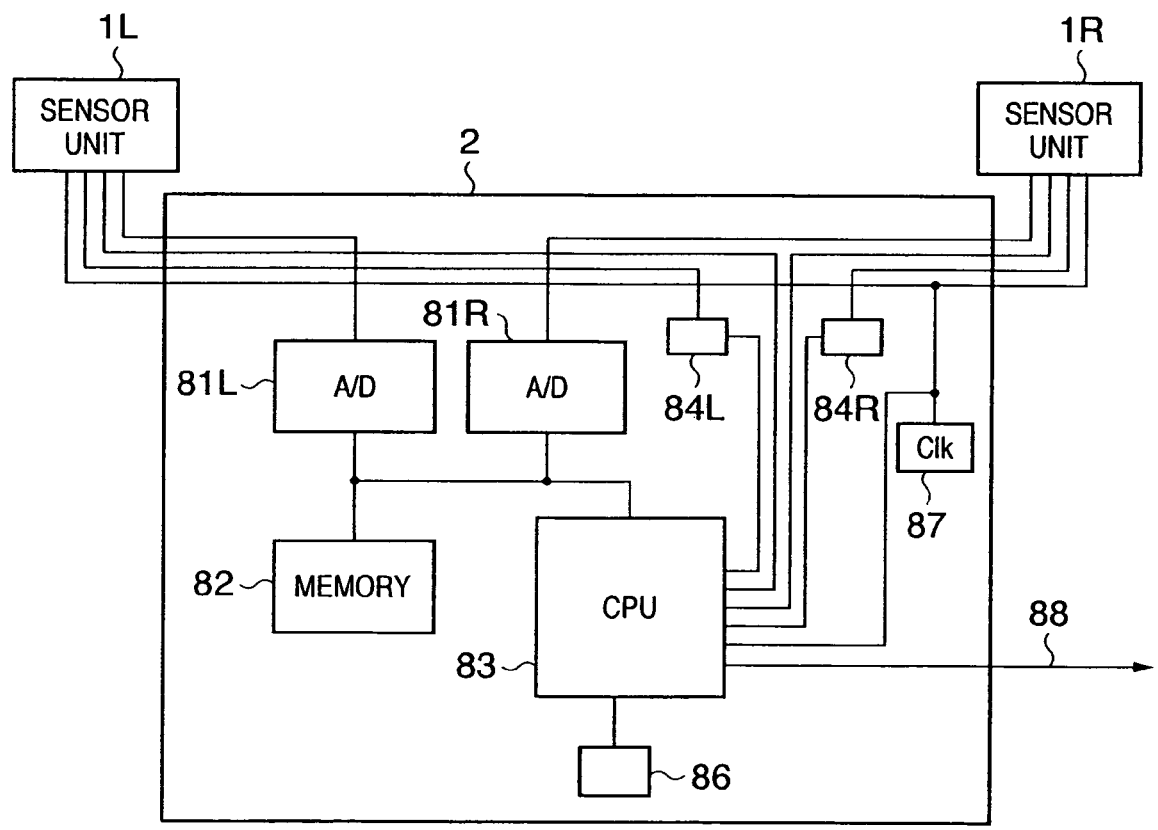
FIG. 8 is a block diagram showing the arrangement of a control/arithmetic unit according to the embodiment of the present invention.

FIG. 8 is a block diagram showing the arrangement of the control/arithmetic unit 2. The CCD control signals are output from an arithmetic control circuit (CPU) 83 which comprises a one-chip microcomputer or the like, so as to set the CCD shutter timings and to attain data output control and the like. The CCD clock signals are sent from a clock generation circuit 87 to the sensor units 1L and 1R, and are also input to the arithmetic control circuit 83 to make various kinds of control in synchronism with the CCDs.

The LED drive signals are supplied from the arithmetic control circuit 83 to the infrared LEDs of the sensor units 1L and 1R via LED drive circuits 84L and 84R.

Detection signals from the CCDs of the photoreceptors of the sensor units 1L and 1R are input to A/D converters 81L and 81R, and are converted into digital values under the control of the arithmetic control circuit 83. The converted digital values are stored in a memory (e.g., a RAM) 82, and are used in angle calculations. After a coordinate value is calculated from the calculated angles, the coordinate value data is output to the host computer 6 via line 88.

(Description of Light Amount Distribution Detection)

Figure 9:
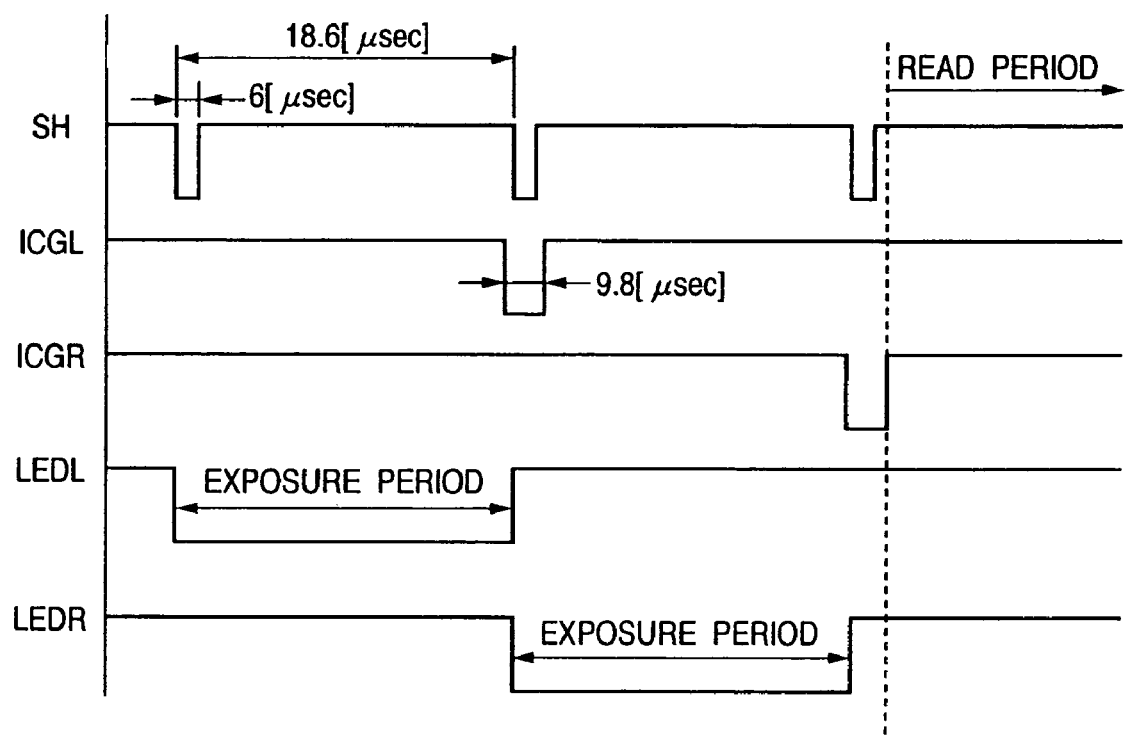
FIG. 9 is a timing chart of signals associated with LED light emission according to the embodiment of the present invention.

FIG. 9 is a timing chart of respective control signals associated with LED light emission.

Signals SH, ICGL, and ICGR are control signals for CCD control, and the CCD shutter release time is determined at the intervals of SH. The signals ICGL and ICGR are respectively gate signals to the left and right sensor units 1L and 1R and are used to transfer charges in internal photoelectric conversion units of the CCDs to read units. Signals LEDL and LEDR are respectively drive signals of the left and right LEDs. In order to turn on one LED in the first period of SH, the drive signal LEDL is supplied to the LED via the LED drive circuit, and the other LED is driven in the next period. After the drive operations of both the LEDs are completed, CCD signals are read out from the left and right sensor units.

Figure 10:
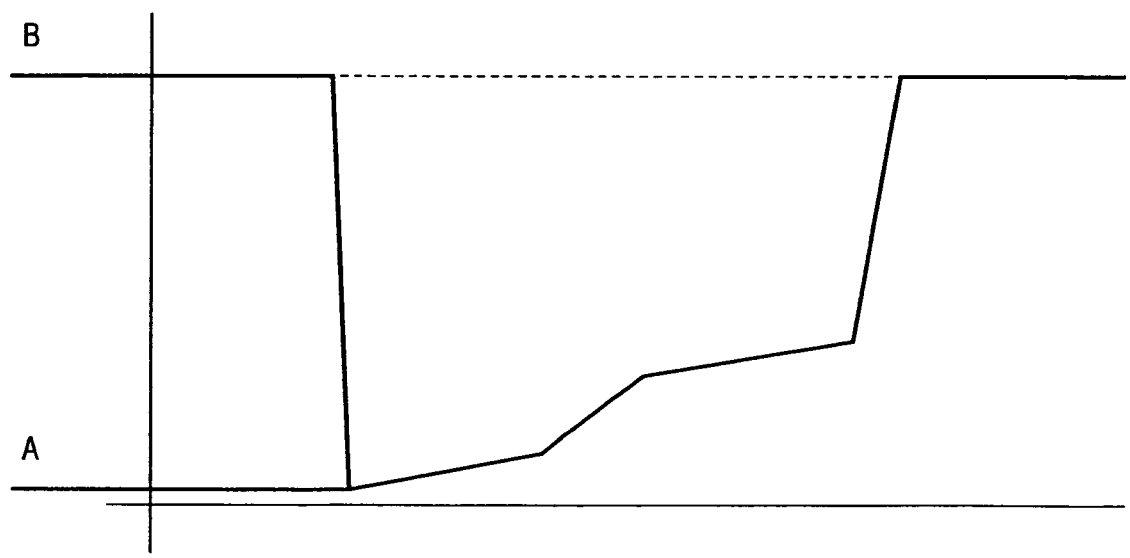
FIG. 10 is a graph showing an example of the light amount distribution of a sensor unit output according to the embodiment of the present invention.

As the signals to be read out, when no input is made, a light amount distribution shown in FIG. 10 is obtained as the output from each sensor unit. Of course, this light amount distribution is not always obtained by every systems, and changes depending on the characteristics of the recurrent reflector 3, the characteristics of the LEDs, and aging (contamination on the reflecting surface). In FIG. 10, a level A corresponds to a maximum light amount, and a level B corresponds to a minimum light amount. That is, in a state of no reflected light, the obtained level is near B, and the level shifts toward A with increasing reflected light amount. In this way, data output from the CCDs are sequentially A/D-converted, and are fetched by the CPU as digital data.

Figure 11:
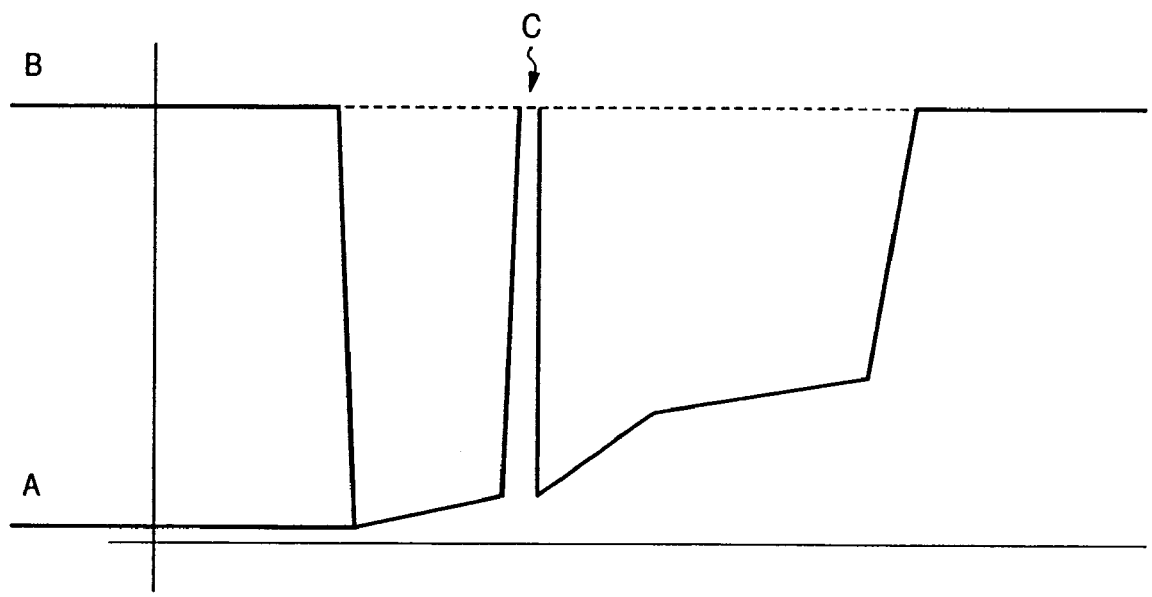

FIG. 11 shows an example of the output when an input is made by a finger or the like, i.e., when reflected light is shielded. Since reflected light of a portion C is shielded by a finger or the like, the light amount of only that portion lowers. Detection is made from such change in light amount distribution. More specifically, an input-less initial state shown in FIG. 10 is pre-stored, and whether or not a change shown in FIG. 11 takes place is detected by a difference from the initial state in each sample period. If the change is detected, an arithmetic operation for determining the input angle to have that portion as an input point is made.

(Description of Angle Calculation)

Upon executing angle calculations, a shade range must be detected first. As described above, since the light amount distribution is not always constant due to aging and the like, it is preferably stored at, e.g., the launch timing of the system. In this way, even when the recurrent reflection plane is contaminated with dust or the like, it can be used except for a case wherein the recurrent reflection plane cannot reflect any light. Data of one sensor will be described below. The other sensor makes the same process.

In an input-less state after power ON, the CCD output is A/D-converted without illumination from the phototransmitter, and this digital data is stored as Bas_data[N] in the memory. This data includes variations of a CCD bias and the like, and has a level near B in FIG. 10. Note that N is a pixel number, and pixel numbers corresponding to an effective input range are used.

Next, the light amount distribution in the illumination state from the phototransmitter is stored. The data to be stored is indicated by the solid line in FIG. 10 and is represented by Ref_data[N]. Using these data, it is determined first if an input is made and if a shade range is detected. Let Norm_data[N] be data in a given sample period.

In order to specify the shade range, the presence/absence of an input is determined based on the absolute change amount of data. This is to prevent any detection errors due to noise or the like, and to reliably detect a change of a predetermined amount. The absolute change amount is calculated at each pixel by:

$$\text{Norm\_data\_}a[N] = \text{Norm\_data}[N] - \text{Ref\_data}[N] \tag{1}$$

where Norm_data_a[N] is the absolute change amount at each pixel.

The calculated absolute change amount is compared with a threshold Vtha which is determined in advance.

Since this process calculates a difference and compares it with the threshold, and does not spend a long processing time, the presence/absence of an input can be made at high speed. When a predetermined number or more of pixels exceed Vtha first are detected, the presence of an input is detected.

In order to allow detection with higher precision, a change ratio is calculated to determine an input point.

Figure 12:
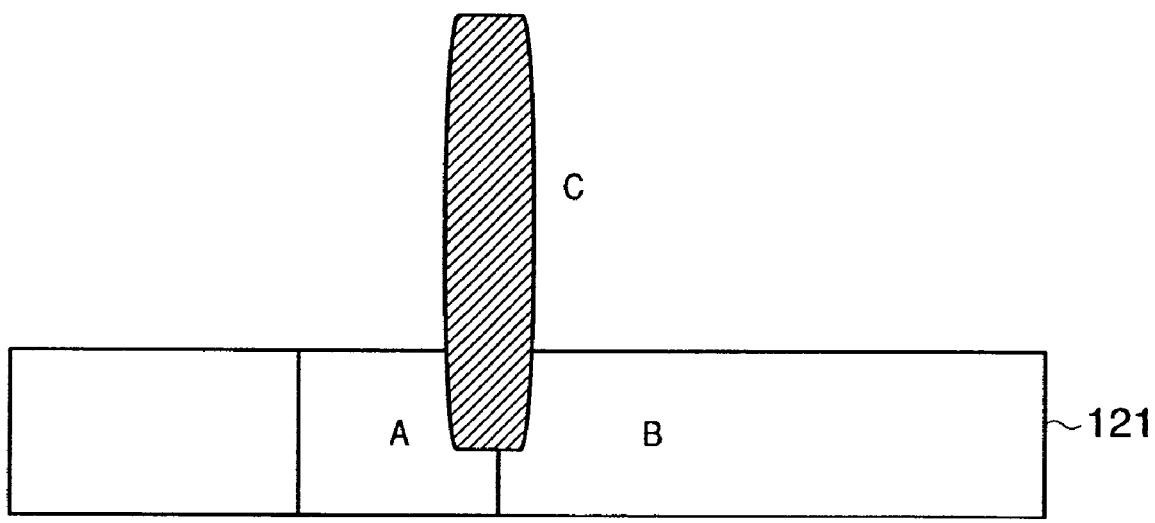
FIG. 12 is a view for explaining an angle calculation according to the embodiment of the present invention.
Figure 13A:
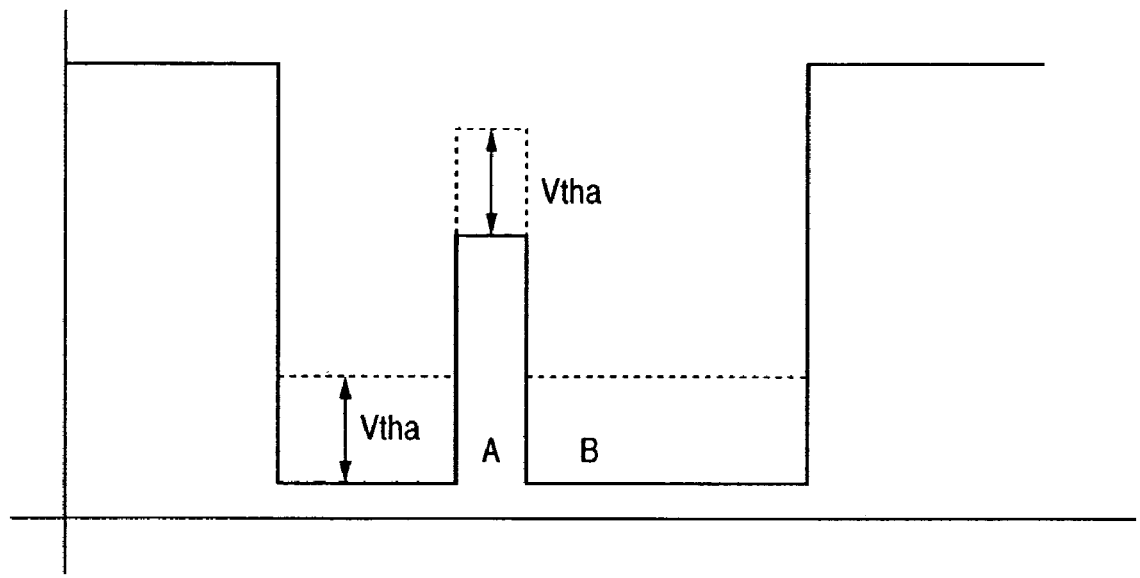
FIGS. 13A and 13B are explanatory views of a change in light amount.
Figure 13B:
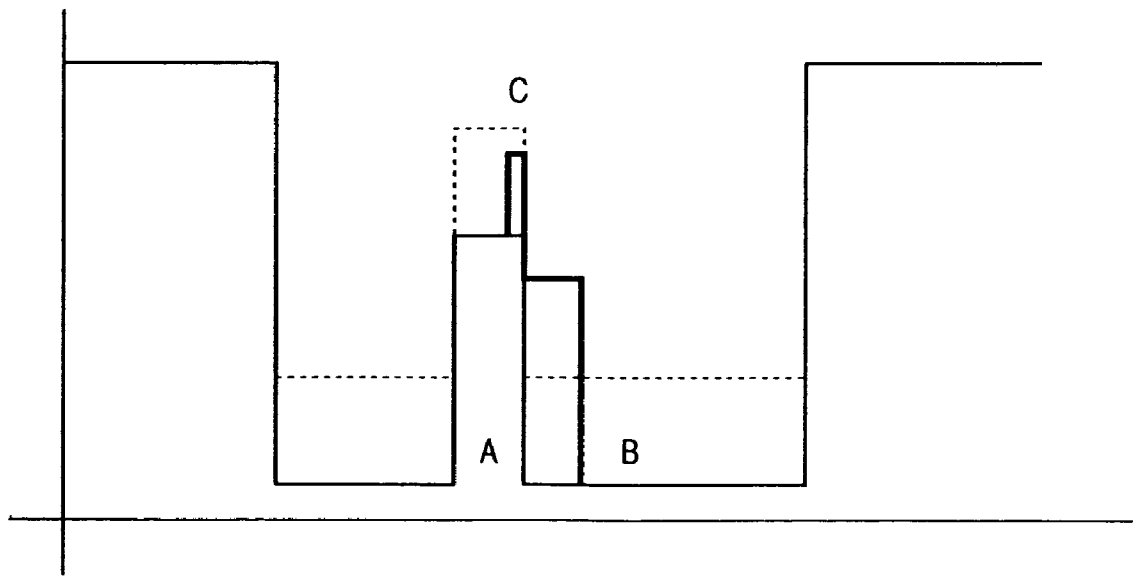

In FIG. 12, reference numeral 121 denotes a recurrent reflection plane of the reflector 3. Assuming that region A has low reflectance due to contamination or the like, the reflected light amount of region A decreases in the distribution of Ref_data[N], as shown in FIG. 13A. In this state, when a pointing device such as a finger or the like is inserted and covers nearly half the recurrent reflector, as shown in FIG. 12, the reflected light amount is nearly halved, and a distribution Norm_data[N] indicated by the bold line in FIG. 13B is observed.

Figure 14A:
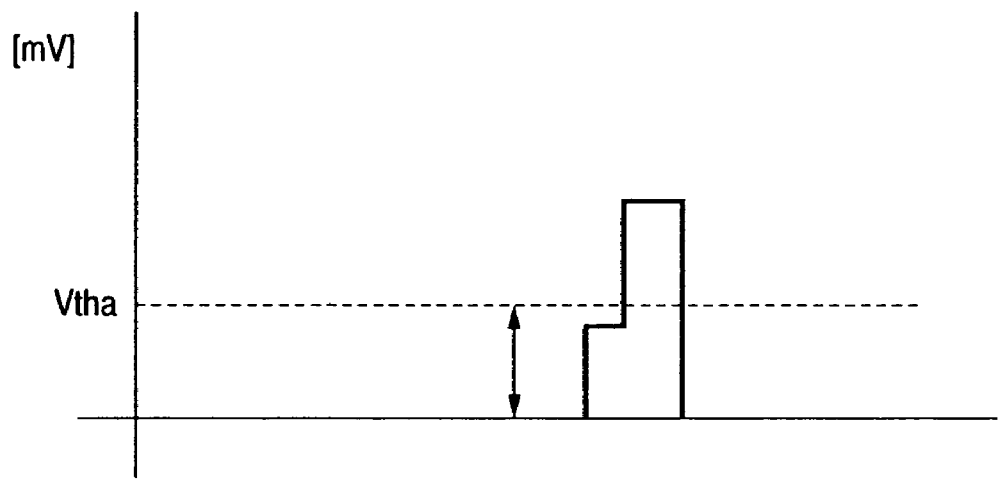
FIGS. 14A and 14B are explanatory views of a light amount change amount and light amount change rate.

If equation (1) is applied to this state, a result shown in FIG. 14A is obtained. In FIG. 14A, the ordinate plots a difference voltage from the initial state. When the threshold is applied to this data, the result may fall outside the original input range. Of course, if the threshold is lowered, an input can be detected to some extent, but it may be influenced by noise or the like.

Hence, the change ratio is calculated. Since the reflected light amounts of both regions A and B are half the initial amounts, the ratio is calculated by:

$$\text{Norm\_data\_}r[N] = \text{Norm\_data\_}a[N]/(\text{Bas\_data}[N] - \text{Ref\_data}[N]) \tag{2}$$

Figure 14B:
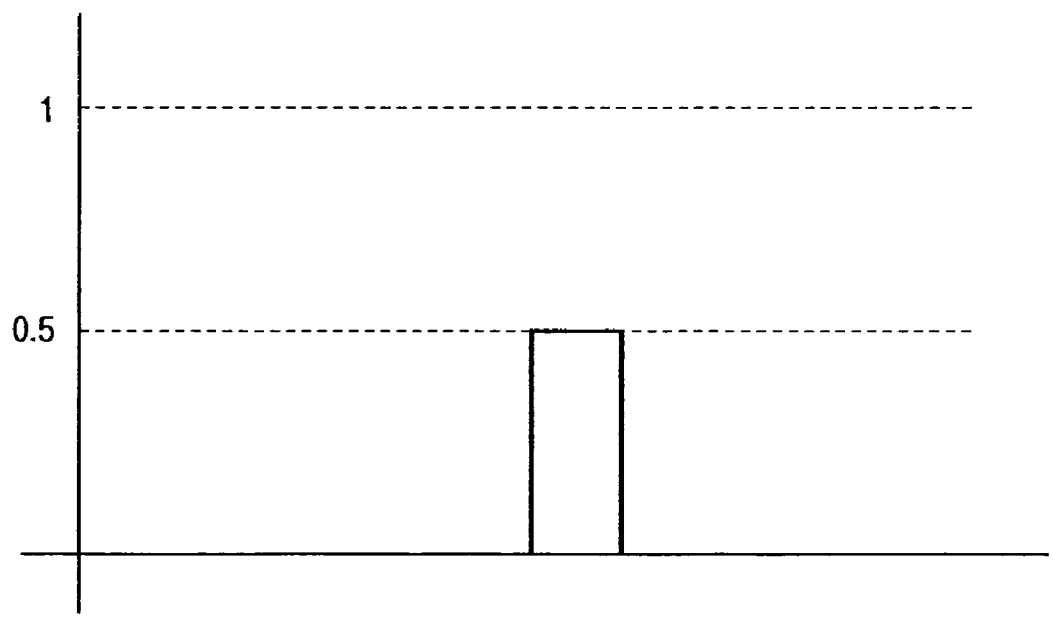

This calculation result is, as shown in FIG. 14B, and is expressed by the change ratio. Hence, even when reflectances are different, data can be equally handled, and detection with high precision is attained.

A threshold Vthr is applied to this data, and an angle is calculated using a central pixel as an input pixel on the basis of the pixel numbers corresponding to the leading and trailing edges of the data. FIG. 14B is illustrated for the sake of convenience: such leading edge does not appear in practice, and pixels exhibit different levels.

Figure 15:
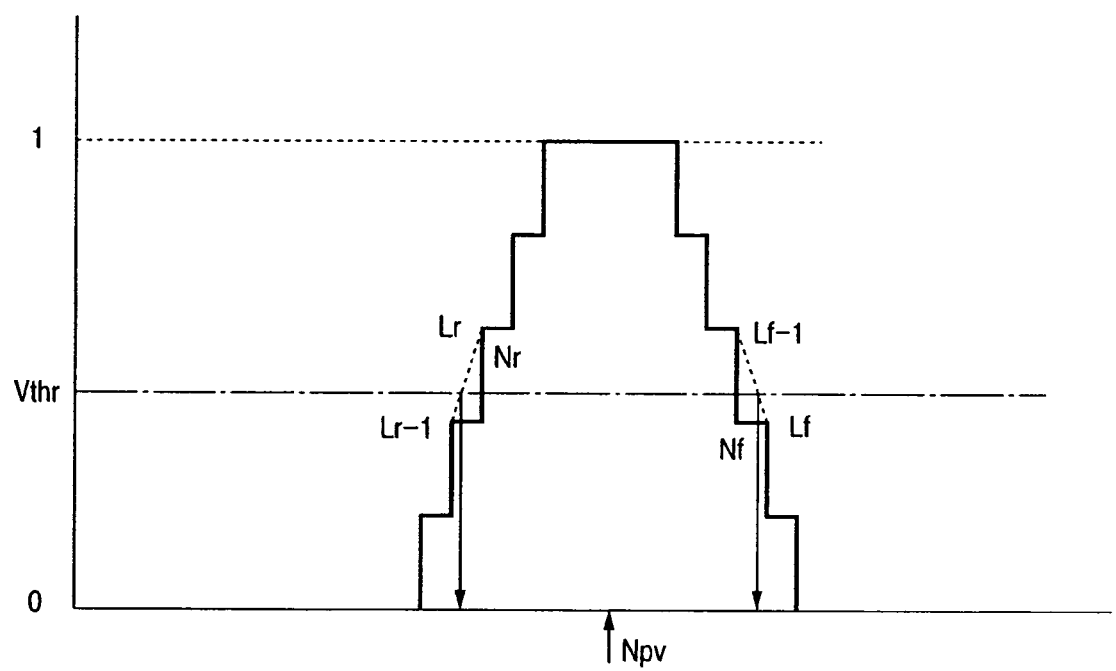
FIG. 15 is a view showing a detection example of a shade range.

FIG. 15 shows a detection example after the ratio calculations. Assuming that detection is made using the threshold Vthr, the leading edge of the shade area exceeds the threshold at the $N_r$-th pixel. Furthermore, the trailing edge becomes lower than Vthr at the $N_f$-th pixel. In this state, a central pixel $N_p$ may be calculated by:

$$N_p = N_r + (N_f - N_r)/2 \quad (3)$$

As a result, the pixel interval has a minimum resolution. Hence, in order to detect more precisely, a virtual pixel number that intersects the threshold is calculated using the level of each individual pixel and that of a pixel immediately before that pixel.

Let $L_r$ be the level of $N_r$, and $L_{r-1}$ be the level of the $N_{r-1}$th pixel. Also, let $L_f$ be the level of $N_f$, and $L_{f-1}$ be the level of the $N_{f-1}$-th pixel. Then, respective virtual pixel numbers $N_{rv}$ and $N_{fv}$ can be calculated by:

$$N_{rv} = N_{r-1} + (\text{Vth}r - L_{r-1})/(L_r - L_{r-1}) \quad (4)$$

$$N_{fv} = N_{f-1} + (\text{Vth}r - L_{f-1})/(L_f - L_{f-1}) \quad (5)$$

A virtual central pixel $N_{pv}$ is expressed by:

$$N_{pv} = N_{rv} + (N_{fv} - N_{rv})/2 \quad (6)$$

By calculating the virtual pixel numbers from the pixel numbers and their levels, detection with higher resolution can be attained.

In order to calculate an actual coordinate value from the obtained central pixel number, the central pixel number must be converted into angle information. In actual coordinate calculations to be described later, it is convenient to calculate a tangent value at a given angle in place of the angle itself. Conversion from the pixel number into tan θ uses table lookup or a conversion formula.

Figure 16:
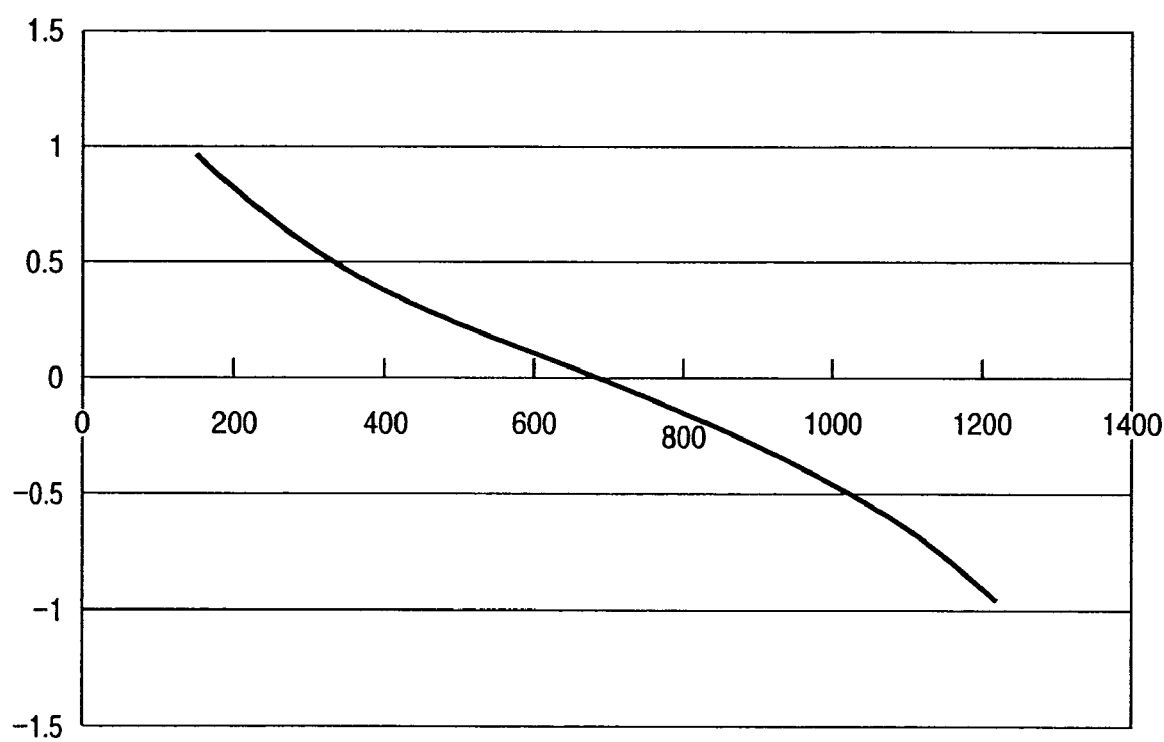
FIG. 16 is a graph obtained by plotting tan θ values for pixel numbers.

FIG. 16 shows a graph formed by plotting tan θ values corresponding to the pixel numbers. An approximate expression is calculated based on this data, and the pixel number—tan θ conversion is made using this approximate expression. If a high-order polynomial is used as the conversion formula, higher precision can be assured. However, the conversion formula can be determined in consideration of the computation performance, precision specification, and the like.

When a 5th-order polynomial is used, six coefficients are required. Hence, this data can be stored in a nonvolatile memory or the like upon delivery or the like.

Let L5, L4, L3, L2, L1, and L0 be coefficients of the 5th-order polynomial. Then, tan θ is given by:

$$\tan\theta = ((((L5*Npr + L4)*Npr + L3)*Npr + L2)*Npr + L1)\\*Npr + L0 \quad (7)$$

When the same process is applied to respective sensors, their angle data can be determined. Of course, the above example calculates tan θ. Alternatively, the angle itself may be calculated, and tan θ may then be calculated based on the angle.

(Description of Coordinate Calculation Method)

Coordinates are calculated from the obtained angle data.

Figure 17:
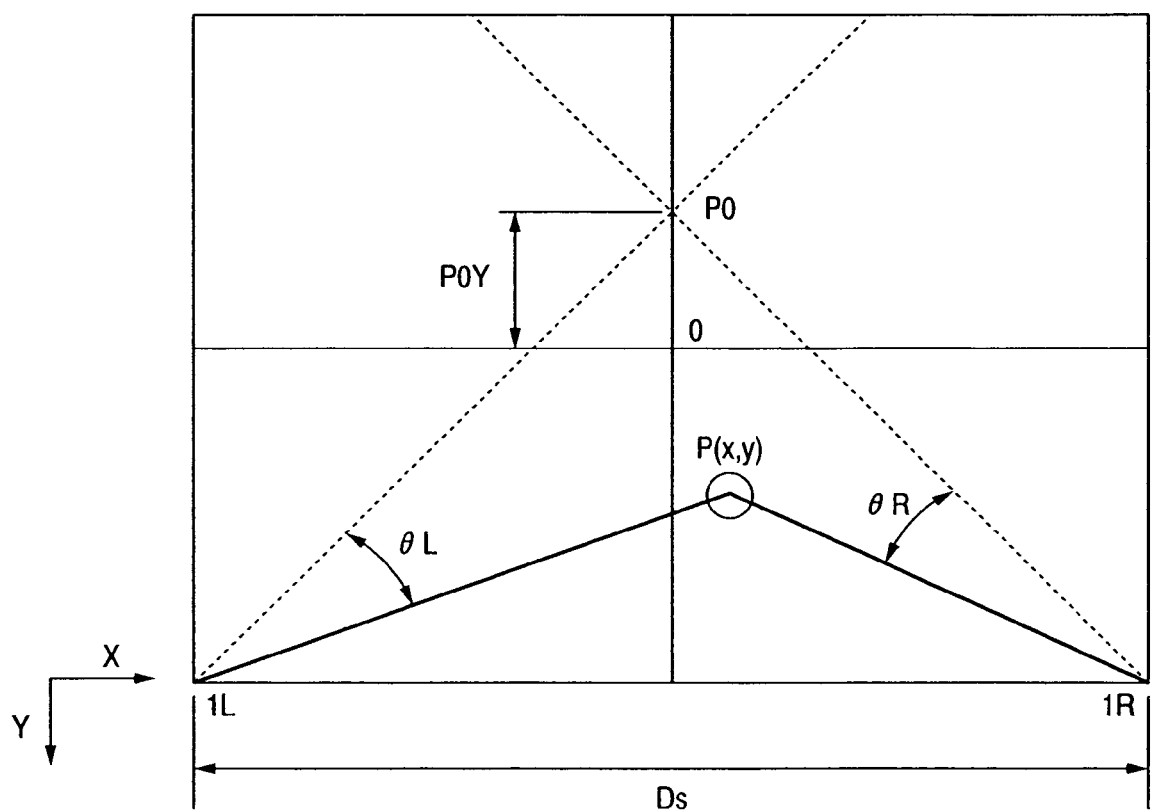
FIG. 17 is an explanatory view of coordinate calculations according to the embodiment of the present invention.

FIG. 17 shows the positional relationship with the screen coordinates. The sensor units are attached to the left and right ends of the lower side of the input range, and the distance between these sensor units is represented by Ds.

The center of the screen is an origin position of the screen, and P0 is an intersection between the angles 0 of the respective sensor units. Let θL and θR be the angles of the sensor units, and tan θL and tan θR are calculated using the above polynomial. At this time, the x- and y-coordinates of a point P are expressed by:

$$x = Ds/2*(\tan\theta L + \tan\theta R)/(1 + (\tan\theta L*\tan\theta R)) \quad (8)$$

$$y = -Ds/2*(\tan\theta R - \tan\theta L - (2*\tan\theta L*\tan\theta R))/(1 + (\tan\theta L*\tan\theta R)) + P0Y \quad (9)$$

Figure 18:
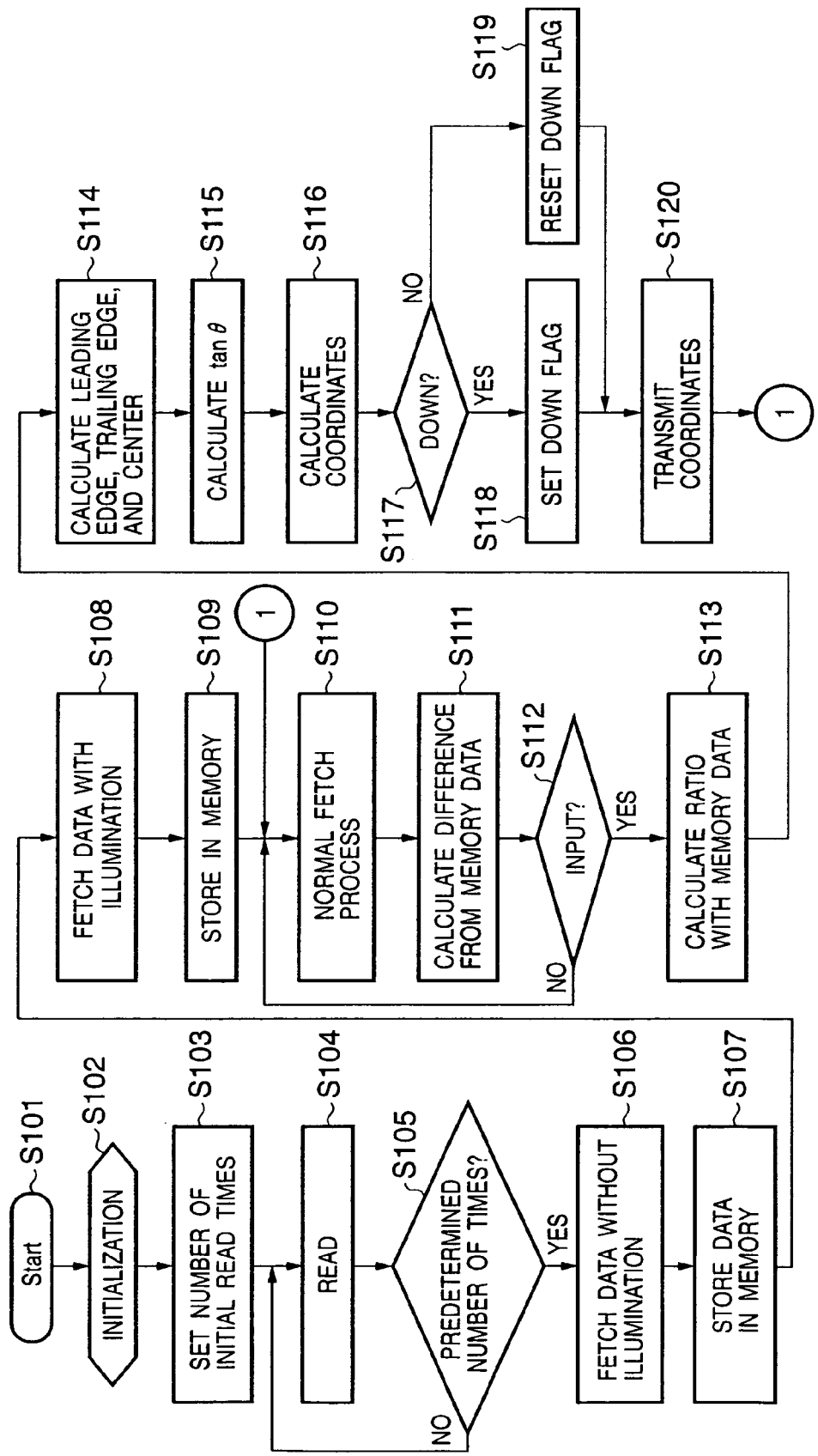
FIG. 18 is a flowchart showing steps from data acquisition until coordinate calculations according to the embodiment of the present invention.

FIG. 18 is a flowchart showing the steps from data acquisition until coordinate calculations.

After the power supply is turned on in step S101, various initialization processes including port settings, timer settings, and the like of the arithmetic control circuit 83 and the like are executed in step S102. Step S103 is preparation for unwanted charge removal, which is done only upon launching. A photoelectric conversion element such as a CCD or the like often accumulates unwanted charges when it is inactive. When such data is used as reference data intact, detection cannot be made, or detection errors are caused. To avoid such problems, a data read process is done a plurality of times first without illumination. In step S103, the number of read times is set. In step S104, data is read out a predetermined number of times without illumination, thus removing unwanted charges.

Step S105 is a decision statement to check if the predetermined number of times is repeated.

Step S106 is a process for fetching data without illumination as reference data, which corresponds to Bas_data. The fetched data is stored in the memory (step S107), and is used in calculations. Data Ref_data, which is another reference data and corresponds to the initial light amount distribution with illumination, is fetched (step S108), and is also stored in the memory (step S109). The steps described so far correspond to the initial setting operations upon power ON, and a normal fetch operation starts from the next step.

The light amount distribution is fetched, as described above, in step S110, and the presence/absence of a shade portion is determined based on the difference value from Ref_data in step S111. If it is determined in step S112 that no shade portion is present, the flow returns to step S110 to repeat the fetch operation.

At this time, if this repetition period is set to be about 10 [msec], sampling is made 100 times/sec.

If it is determined in step S112 that a shade area is present, the ratio is calculated by the process given by equation (2) in step S113. The leading and trailing edges are determined using the threshold with respect to the obtained ratio, and a central value is calculated using equations (4), (5), and (6) (step S114). From the calculated central value, tan θ values are calculated using the approximate polynomial (step S115), and x- and y-coordinates are calculated using equations (8) and (9) based on the tan θ values of the left and right sensor units (step S116).

It is checked in step S117 if a touch has been made. In this step, a proximity input state like a state in which a cursor is moved without pressing any mouse button, or a touch-down state as a state in which a left button has been pressed is determined. In practice, if the maximum value of the previously obtained ratio exceeds a predetermined value (e.g., 0.5), "down" is determined; otherwise, the proximity input state is determined. According to this result, a down flag is set (step S118) or reset (step S119).

Since the coordinate value and down state are determined, these data are transmitted to the host computer 6 (step S120). In the host computer 6, a driver interprets the received data, and moves a cursor, changes a mouse button state, or the like with reference to the coordinate value, flag, and the like.

Upon completion of the process in step S120, the flow returns to the operation in step S110, and the above processes are repeated until power OFF.

(Description of Coordinate Input Pen)

In the coordinate input apparatus of this embodiment, a finger input operation is allowed. Also, when input operations are made using a pointing device such as a pen or the like, operations corresponding to various buttons of a mouse can be intuitively made. A coordinate input pen (to be referred to as "pointing device" or "pen" hereinafter) 4 of this embodiment will be described below using FIG. 19.

Figure 19:
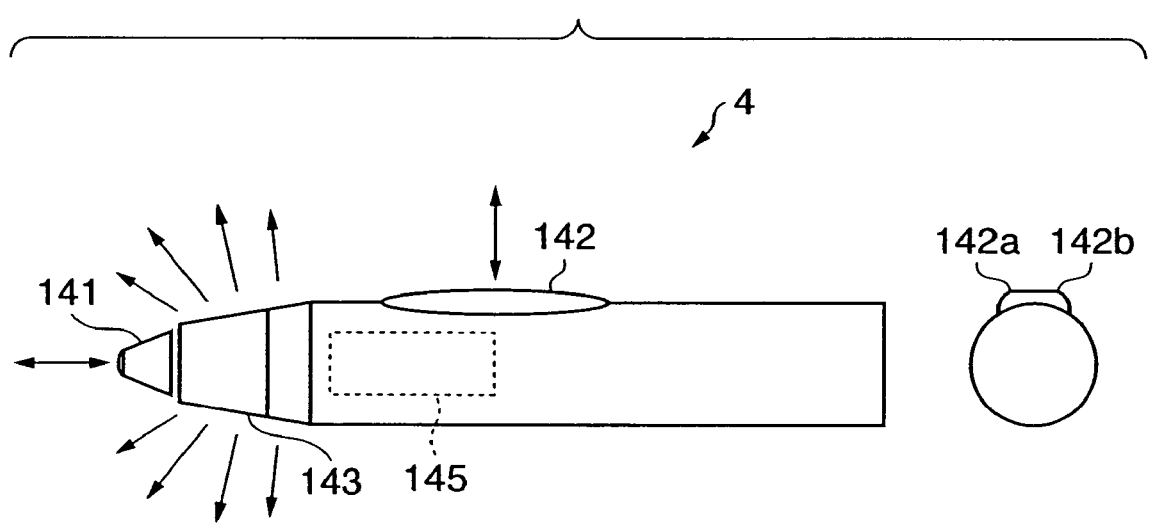
FIG. 19 is a view showing the arrangement of a pointing device according to the embodiment of the present invention.

The pointing device 4 of this embodiment comprises a pen tip switch (SW) 141 which is enabled when the pen tip portion as a writing tool is pressed, a plurality of pen side switches (SW) 142 provided to a housing of the pointing device 4, an infrared LED 143, and a drive circuit. In this embodiment, the plurality of pen side switches (SW) 142 includes two side switches 142a and 142b as illustrated in FIG. 19. When one of these switches is enabled, a signal is transmitted from the pointing device 4 at predetermined periods. More specifically, the drive circuit 145 emits optical signals serving as timing signals and command signals at predetermined periods.

This optical signal is received by a control signal detection circuit 86 (see FIG. 8). The control signal detection circuit 86 determines the enabled one of the switches of the pointing device 4 on the basis of the received optical signal. At the same time, the sensor units 1L and 1R begin to exchange CCD control signals, CCD clock signals, and LED drive signals. More specifically, the pointing device 4 superposes a signal indicating switch information on the optical signal emitted as a timing signal (in addition, an identification code or the like used to identify the coordinate input pen can be superposed). As a method of transmitting such information, a leader field which includes a consecutive pulse train, and a header field which follows the leader field and includes a code (vendor ID or the like) are output first, and a transmission data sequence including control signals and the like (e.g., a pen switch signal, etc.) is sequentially output in accordance with the order and format which are defined in advance. This method is well known (e.g., a remote controller utilizing infrared rays), and a detailed description thereof will be omitted.

As another method, the enabled switch can be identified based on the above information detected by changing the predetermined period of the coordinate input apparatus of this type that makes coordinate detection at the predetermined periods. If the coordinate input apparatus has a specification that can make coordinate detection at a maximum of 100 points/sec, i.e., at 10-msec intervals, settings are made to make coordinate calculations at, e.g., 100 points/sec when the pen tip SW 141 is enabled, and to make coordinate calculations at 80 points/sec when a given pen side SW 142 is enabled. In other words, the pointing device 4 emits signals at these periods. Hence, the control signal detection circuit 86 can detect the enabled switch by monitoring the periods.

A detailed arrangement of the pointing device 4 will be described later.

When the tip of the pointing device 4 is pressed against the input region 5, the pen tip switch 141 is turned on, and a state in which the operator is about to make a coordinate input so as to input handwriting ("pen down" state) is set. When the operator enables the pen tip switch twice within a predetermined period of time, the double-clicking action of a mouse is recognized by monitoring the reception times and interval of signals, coordinate calculation timings, or the like with reference to the coordinate sampling rate of the coordinate input apparatus.

(Description of Up/Down of Coordinate Input Pen)

Figure 20:
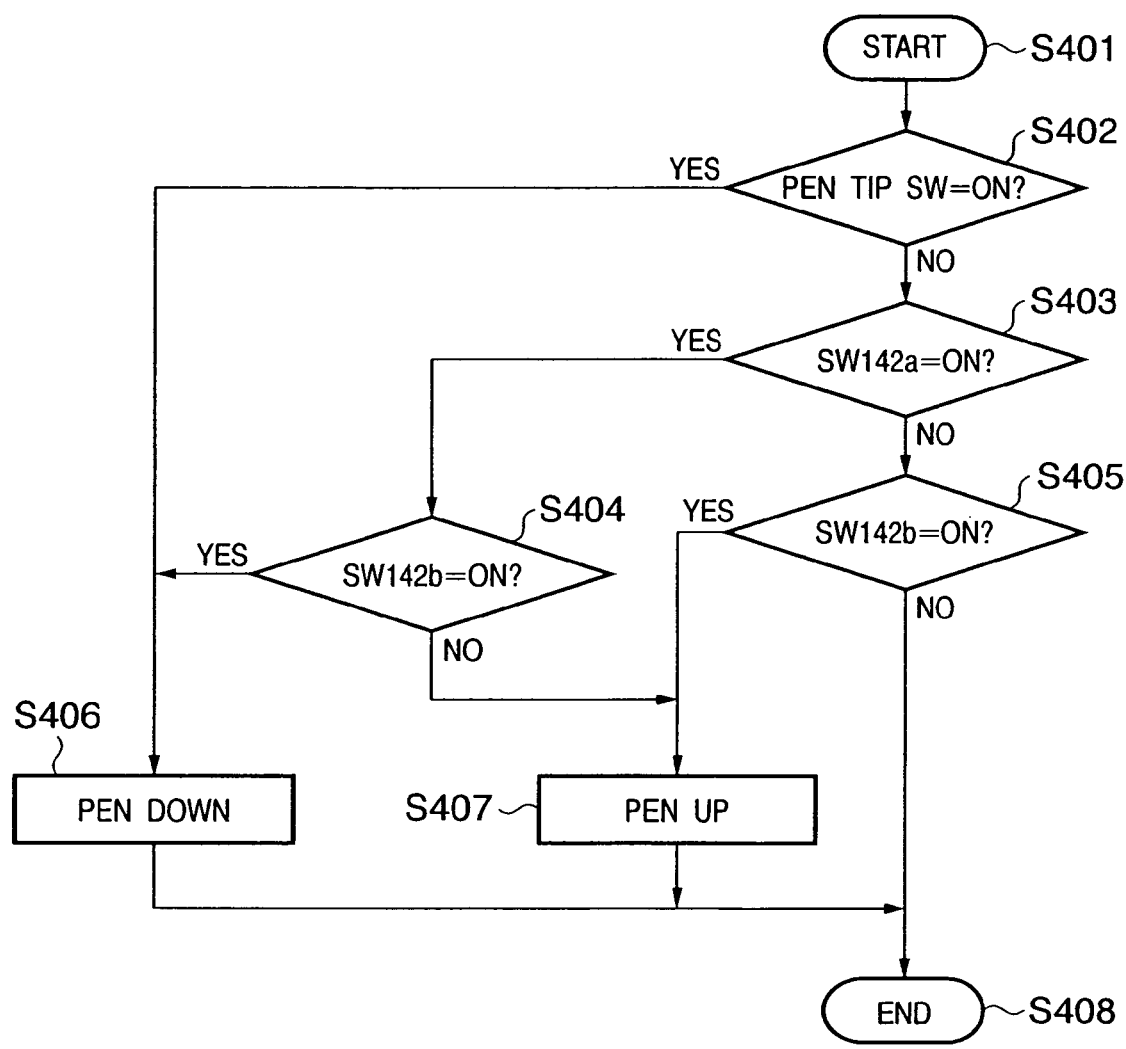
FIG. 20 is a flowchart showing the process for determining the operation state of the pointing device according to the embodiment of the present invention.

The pen up/down process will be described below with reference to the flowchart of FIG. 20.

The state of the pen tip switch 141 is checked in step S402. The ON state of the pen tip switch 141 is a state in which the coordinate input pen is located on the input region 5, and the operator is about to make coordinate input so as to input handwriting ("pen down" state), and the handwriting displayed on the screen is faithfully reproduced in correspondence with the writing action by the operator. Also, for example, when the operator enables the pen tip switch twice within a predetermined period of time, the double-clicking action of a mouse is recognized by monitoring the reception times and interval of signals, coordinate calculation timings, or the like with reference to the coordinate sampling rate of the coordinate input apparatus.

On the other hand, if it is determined in step S402 that the pen tip switch 141 is not enabled (OFF state). The states of the pen side switches are checked in steps S403 to S405. In this embodiment, the plurality of pen side switches 142 includes two pen side switches 142a and 142b as described above, and operates as a "pen up" state if either of these switches is ON or a "pen down" state if both of these switches are ON.

In this manner, if the pen tip switch 141 is OFF and at least one of the side switches 142a and 142b is enabled (ON state), the operator is about to control the screen while suspending the pointing device 4 from the input region 5, i.e., is about to move a cursor to a desired position or to input handwriting at the suspended position (this input state will be referred to as "proximity input" hereinafter). More specifically, in the pen up state, i.e., when one of the side switches 142a and 142b is enabled, the operator can move the cursor displayed on the screen. In the pen down state, i.e., when both of these switches are enabled, the operator can display a moving trace of the pointing device as handwriting in a mode to be described later. Since the pointing device 4 is configured to simultaneously output the pen state (pen up/pen down) as information so as to implement such functions when the coordinate input apparatus calculates coordinates, control software, application software, or the like stored in the host computer 6 can implement a desired action on the basis of the information.

On the other hand, the state in which one of the switches of the pointing device 4 is enabled corresponds to a state wherein coordinate calculations are always made at the predetermined periods, i.e., signals are emitted from the pointing device 4 at predetermined periods. Therefore, whether coordinates are consecutively input from the coordinate value detected first or the consecutive coordinate input is interrupted can be determined by checking if optical signals as timing signals can be detected at predetermined periods. That is, by monitoring the generation timings of start signals (which are generated at 0.01-sec intervals if the coordinate sampling rate is 100 times/sec) of the control signal detection circuit 86, the consecutive input state can be determined.

Alternatively, as means for determining a consecutive input, a predetermined period of time may be set, and whether a signal (e.g., the optical signal as the start signal in this embodiment) or a coordinate value is detected within the predetermined period of time may be determined.

(Description about Detection of Input Coordinates by a Plurality of Pointing Devices)

In the above description, the number of shades detected by the CCD of each sensor unit is one (only one input coordinate value). A case will be explained below wherein a plurality of input coordinate values are calculated and are output to the host computer 6 when a plurality of operators make input using their pointing devices.

In this case, when a plurality of coordinate values as many as the number of pointing devices are to be output to the host computer 6, the coordinate values must be output after the attribute information of each pointing device is appended to the corresponding coordinate value. That is, in order to display coordinate values input by the pointing devices as consecutive input trances for respective pointing devices, the computer must recognize the pointing devices used to input the coordinate values. Hence, this embodiment adopts an arrangement in which optical signals emitted by the pointing devices are detected by the sensor units in addition to the control signal detection circuit 86.

FIGS. 21A to 21H are timing charts showing control signals and CCD detection signals when the plurality of pointing devices are used.

Assume that two pointing devices are used to input, and are defined as pens 1 and 2, respectively. Signals of FIGS. 21A and 21B are pen control signals transmitted by pens 1 and 2 as the pointing devices. The pen control signals are data sequences of infrared rays. In these data sequences, a and a' of the former half indicate switch signals, and b and b' of the latter half indicate ID signals.

Signals of FIGS. 21C and 21D are generated by the arithmetic control circuit 83 in accordance with the pen control signals of FIGS. 21A and 21B, and are switched to Hi/Low in accordance with the pen control signals detected at predetermined periods.

Signals of FIGS. 21E and 21F are control signals for CCD control, and are as described above. Hence, a description of these signals will be omitted.

As described above, when two shades h and i are detected in a CCD detection waveform of FIG. 21H detected by the normal fetch operation, it is determined that there are a plurality of inputs. Note that FIGS. 21A to 21H show only the CCD detection waveforms of one sensor unit. However, when the number of shades detected by either CCD is at least two, it is determined that there are a plurality of inputs.

When it is determined that there are a plurality of inputs, the CCD control signal is transmitted in synchronism with a timing e which is synchronized with the leading edge of the first pulse of the next pen control signal to be detected. An optical signal corresponding to a pulse width d is detected by the CCD during a shutter interval g. At this time, the illumination LED of the sensor unit is turned off by a control signal of FIG. 21G so as not to influence the dynamic range of the CCD. The detected waveform becomes, e.g., j and k of the CCD detection waveform of FIG. 21H, and if the number of pixels falls within a predetermined range by comparing a pixel number 1 corresponding to a shade h which was detected and stored previously with the currently detected pixel number m, it is determined that the shade h is input by pen 2 as the pointing device.

Note that the shutter interval g is varied as needed by the width of shades h and i previously detected by the CCD so that detection can be made at an appropriate level so as not to influence the dynamic range of the CCD. That is, when the previously detected shade width is broad, the shutter interval is controlled to be short; when it is narrow, the shutter interval is controlled to be long.

A description about association between the shades and ID signals of the pens will be given using examples of the coordinates on the input region 5 and waveforms detected by the CCD with reference to FIGS. 22A and 22B and FIG. 23.

Figure 22A:
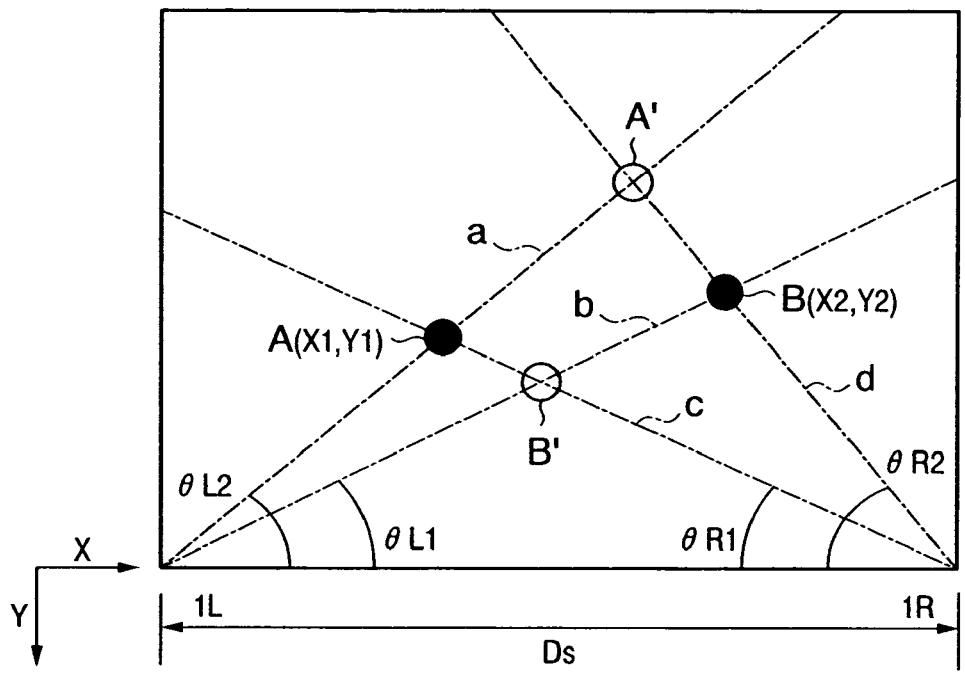
FIGS. 22A and 22B are views for explaining an example of coordinate calculations when the plurality of pointing devices are used.

FIG. 22A shows a case wherein inputs are made at positions A and B indicated by full dots on the input region 5. In this case, rough CCD detection waveforms are observed as (1)(a)(L) and (1)(b)(L) of FIG. 23 by the sensor unit 1L, and are observed as (1)(a)(R) and (1)(b)(R) of FIG. 23 by the sensor unit 1R. At this time, as described above, since a pixel number NL1 calculated for a shade QL1 and a pixel number NL2 corresponding to detection light (control signal) PL1 of the pen fall within a predetermined value range, it is determined that QL1 corresponds to PL1. Likewise, it is determined that a shade QR1 corresponds to PR1. Therefore, assuming that the number of pointing devices allowed to input is two, since one of the two shades is determined, it is determined that another shade is input by the other pointing device.

Figure 23:
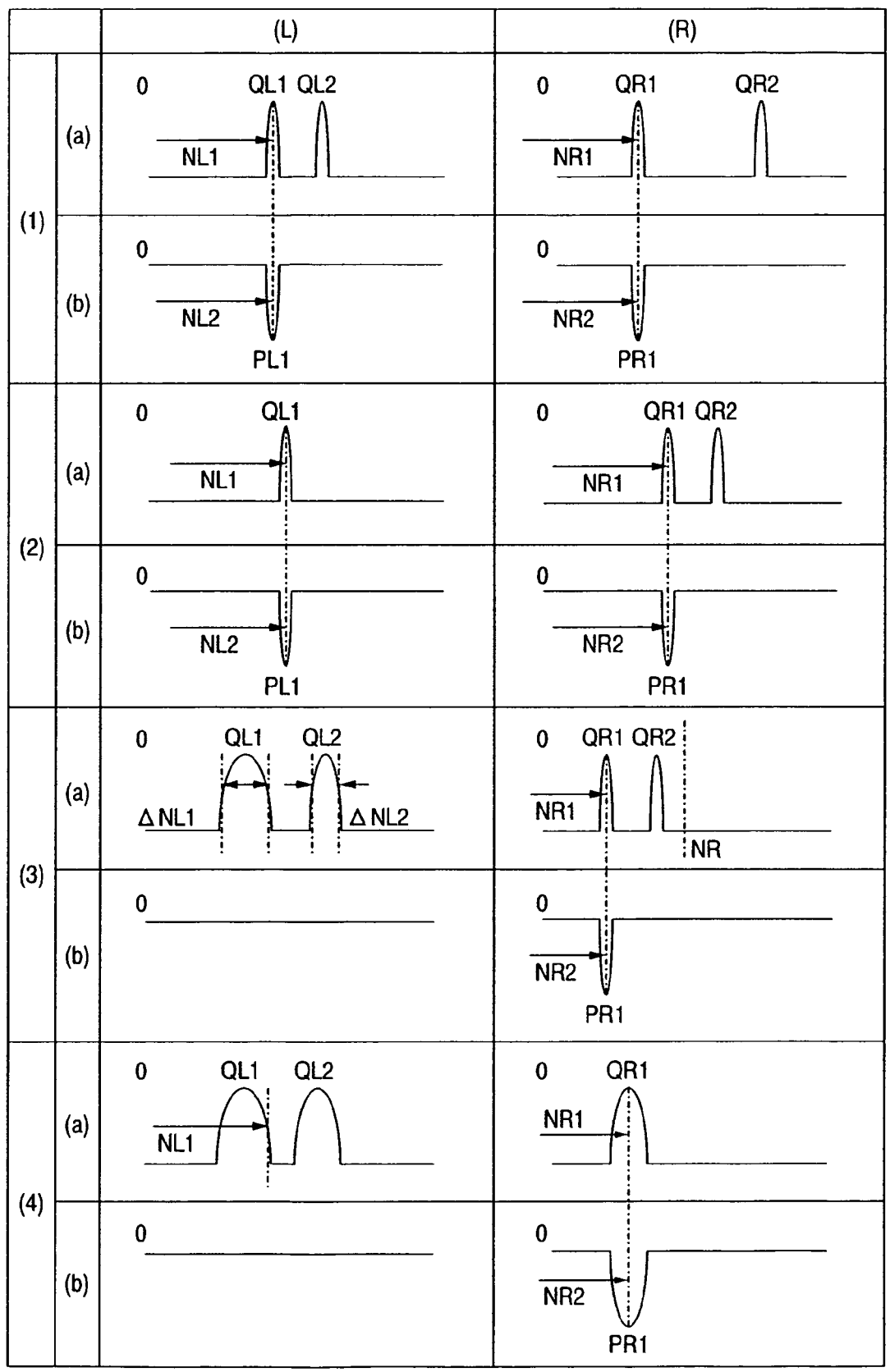
FIG. 23 is a view for explaining an example of coordinate calculations when the plurality of pointing devices are used.

Meanwhile, when coordinates are calculated using the shades QL1, QL2, QR1, and QR2 in (1) of FIG. 23, coordinates A, B, A', and B' in FIG. 22A are calculated, i.e., true coordinates A and B, and false coordinates A' and B' are calculated, and true/false determination is required to calculate correct coordinates. However, when combinations of shades corresponding to the pointing devices are determined in advance, and coordinates are calculated using the CCD pixel numbers calculated based on the shades of the respective combinations, coordinates A and B can be uniquely determined.

Figure 22B:
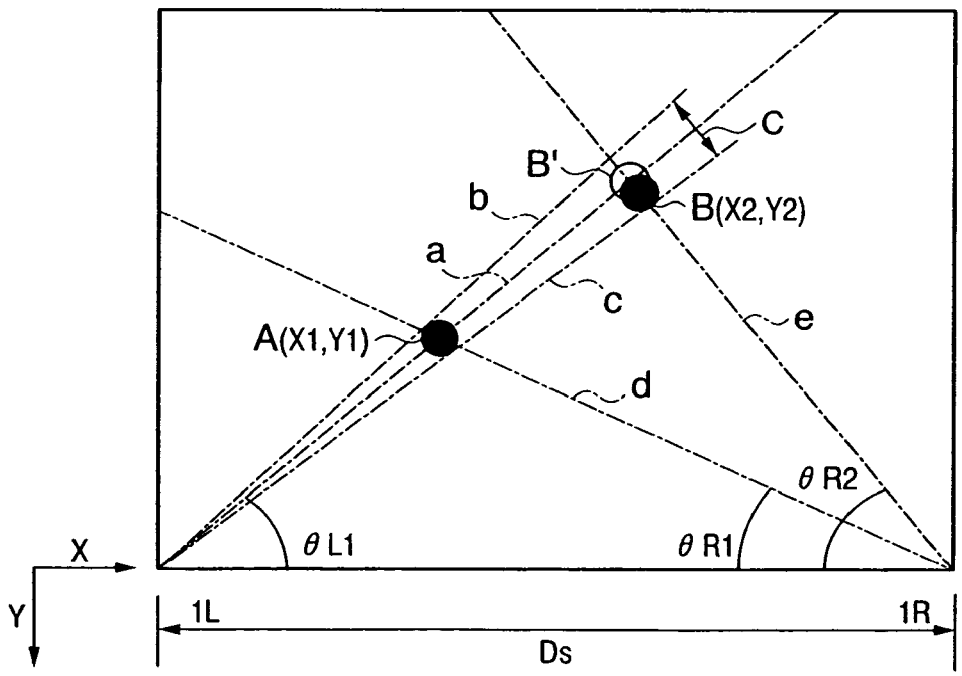

When coordinates A and B nearly line up when viewed from the sensor unit 1L, as shown in FIG. 22B, coordinates B located at the back side viewed from the sensor unit side cannot be seen from that sensor unit due to the influence of the pen whose input position is located at the front side viewed from the sensor unit side. At this time, the CCD detection waveforms are detected as (2)(a) in FIG. 23, and in the waveform detected by the sensor unit 1L, only one shade is detected like (2)(a)(L) in FIG. 23. On the other hand, since the waveform detected by the sensor unit 1R includes two shades like (2)(a)(R) in FIG. 23, it is determined that there are a plurality of inputs, and correspondence with the pen control signals is determined. In this case, since the CCD of the sensor unit 1L detects only a pen signal corresponding to coordinates A, it is determined that QL1 corresponds to detected PL1. At this time, if the sensor unit 1R detects PR1, it is determined that QR1 corresponds to PR1.

Note that coordinates B are undesirably calculated as a point of B' in FIG. 22B if nothing is done. In case of FIG. 22B, the location of B within a range C is unknown if nothing is done. Hence, coordinates B are calculated based on a correction value k which is derived from the relationship between the distance from the sensor unit 1R to coordinates B and the shade width QR2. This correction value k is calculated in advance on the basis of the relationship between the distance, which is calculated from the sensor unit and input coordinates, and the shade width detected by the CCD, is stored in the memory as table information, and is called from the arithmetic control circuit as needed when it is used. When the shades overlap each other in this manner, a third sensor may be arranged in addition to the method of correcting using the relationship between the distance and range. That is, when the number of shades detected by one sensor is 2, and that detected by another sensor is 1, the sensors may be switched to detect inputs from a non-overlapping direction. Even in such case, coordinates can be calculated with higher precision.

Figure 24:
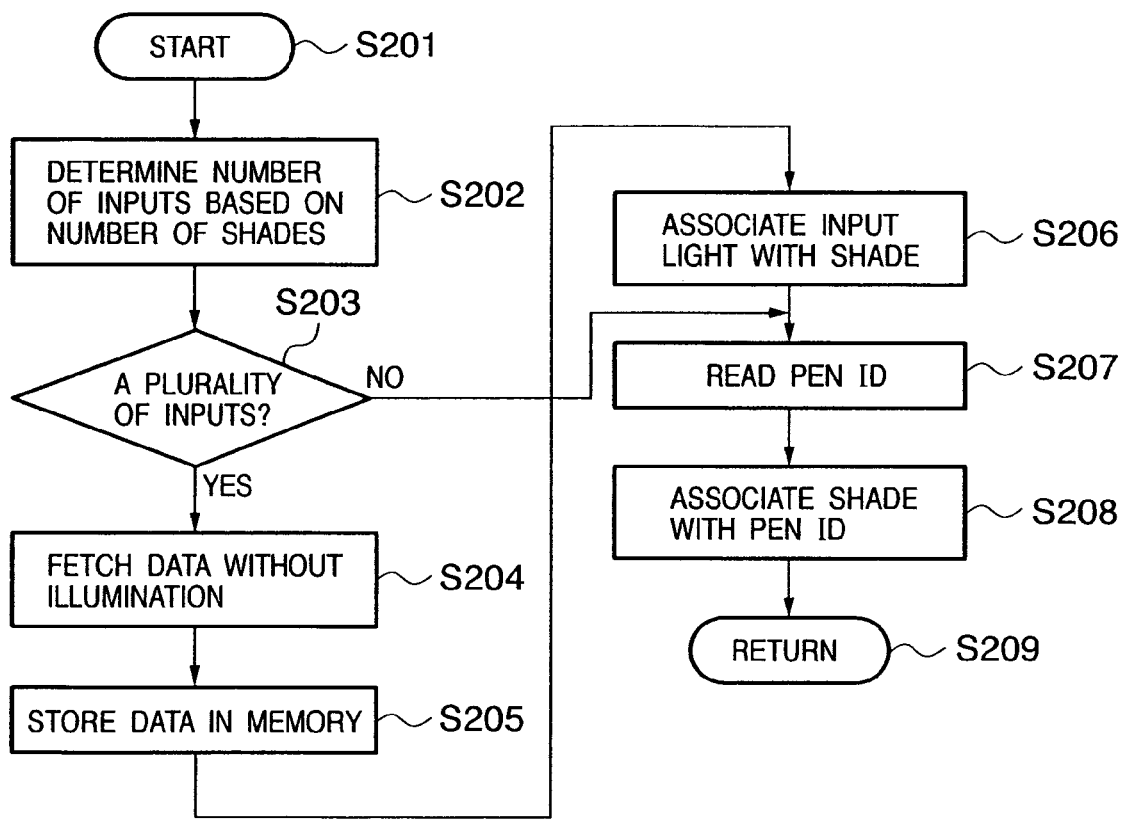
FIG. 24 is a flowchart showing the process for associating shades and pen IDs in consideration of use of the plurality of pointing devices.

FIG. 24 is a flowchart showing the process for associating the shades and pen IDs in consideration of use of the plurality of pointing devices. The aforementioned process for determining a plurality of inputs is executed in accordance with the flowchart shown in FIG. 24. This routine is called from step S114 of the flowchart shown in FIG. 18, and is executed as follows.

In step S202, the number of shades is detected on the basis of the number of central pixel numbers between the previously calculated leading and trailing edges. If at least one sensor detects the two shades, it is determined that a plurality of inputs are made. Therefore, it is determined in step S203 that a plurality of inputs are made, a data fetch process without illumination is executed at a timing synchronized with the next pen control signal in step S204. The detected data is stored in the memory in step S205, and a process for determining the correspondence between the shades and detection light beams based on the control signals of the pointing devices is executed in step S206.

In step S207, a pen ID information read process is executed. In step S208, a process for associating the shades and pen IDs is executed on the basis of the relationship between the shades and control signals of the pointing devices processed in step S206. The determined values are returned in step S209. If it is determined in step S203 that each of the two sensors detects one shade, the flow advances to step S207, and the process for returning the shade and pen ID is executed in step S209 as in the above case.

In the arrangement of the above description, the pointing device 4 transmits a control signal only when its SW is pressed. When ID information is assigned in a proximity input mode, ID signals are transmitted for respective samples even when the SW of the pointing device 4 is not operated, and the shade is associated with the control signal light, thus realizing the proximity input. In this case, when an ID signal is detected by detecting the control signal, but no shade is detected, the host computer 6 outputs nothing. When both the shade and SW signal are detected, the pen SW signal is checked to determine the proximity input mode, and coordinate information is transmitted to the host computer while assigning the ID signal to the coordinate value. In this way, the process with the pen ID information can also be made in the proximity input mode.

For example, when the wait time process is prolonged since light beams for a plurality of pen control signals are superposed, and a problem is posed with the transmission periods of coordinates to the computer, the attribute of the pointing device may be checked for the first coordinate point corresponding to the detected input, and the subsequent coordinates may be transmitted by assigning information indicating continuity of the input coordinates to the coordinate information. The continuity of the input coordinate values can be determined on the basis of the distance between the previous and current coordinate values, vector information, and the like.

Figure 27:
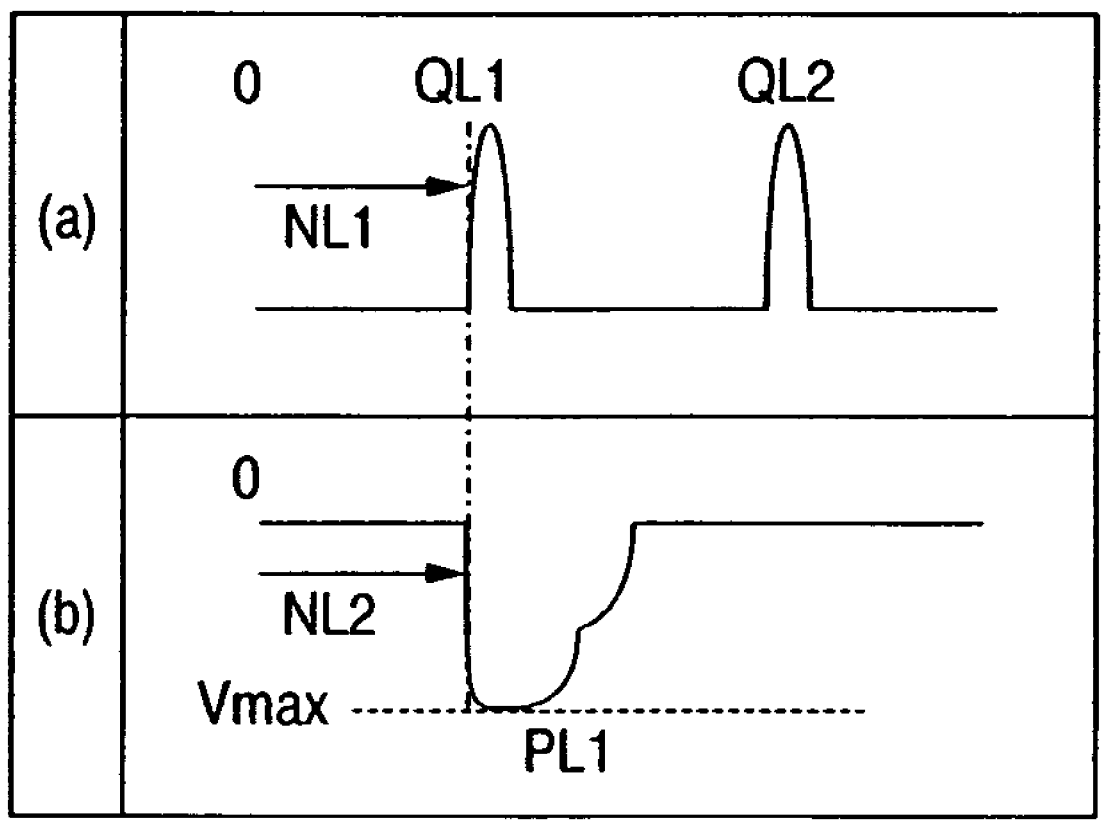
FIG. 27 is a view showing an example of CCD detection waveforms when a CCD receives an input that exceeds a maximum allowable voltage value.

In the above description, whether or not the waveform detected by the CCD includes a shade is determined by calculating the leading and trailing edges of the detected waveform to obtain a nearly central pixel number. However, when the dynamic range of the CCD is considered, if an input that exceeds the maximum allowable voltage value Vmax of the CCD is made, its influence may reach the subsequent detected waveforms, as shown in FIG. 27. Therefore, the shade may be associated with the trailing edge information before the CCD is saturated. In this case, NL1 determined based on the leading edge information is calculated for the shade, NL2 determined based on the trailing edge information is calculated for light of the pen control signal, and they are compared with each other, thus associating the shade and pen.

In the above description, the case has been explained wherein the number of input pointing devices is two. Even when the number of pointing devices is three or more, the shades and pointing devices can be associated with each other by detecting light beams of the control signals of the pointing devices in turn. Furthermore, inputs using a finger and pen together are allowed. For example, an ID signal may be assigned to only a coordinate value, which is calculated based on a shade with which pen control signal light is associated. On the other hand, a shade with which no pen control signal light is associated may be determined as an input by the finger, and a flag indicating the finger input may be assigned to the coordinate value.

If the same processing method is used, for example, in a specification that permits use of only pens, and inhibits finger inputs, a process for determining a shade with which no pen signal is associated as a detection error, and inhibiting its coordinate value from being output can be executed. For example, even when a sleeve or hand touches the screen and is detected as a shade when an input is made using the pen, coordinates input by only the pen can be output, thus providing a convenient coordinate input apparatus.

With the above arrangement, various processes corresponding to the attributes of pointing devices can be made by, e.g., assigning color information to be displayed on the computer to each pointing device in advance. In addition, the aforementioned processes can be attained with low cost without increasing the number of parts, since an optical signal as a pen control signal is detected by the CCD for coordinate detection (shade detection). Furthermore, since a plurality of coordinate values can be transmitted to the computer while assigning the attributes of the pointing devices which can be uniquely determined, a coordinate input apparatus which allows a plurality of operators to use an application on the computer with high operability without limiting the functions can be provided.

(Description of Case with Undetectable Region)

An optical signal emitted by the infrared LED 143 (FIG. 19) which forms the pointing device 4 is preferably detected on the entire input region 5 by the control signal detection circuit 86. In some cases, an optical signal of the control signal cannot be detected on the entire inputtable region by the sensor unit depending on the positional relationship between the position (height from the input plane) of a phototransmitter member formed by the infrared LED 143 in the pointing device 4.

A case will be explained below using FIGS. 25A and 25B and FIG. 23 wherein a region that cannot be detected by the sensor unit 1L exists.

Figure 25A:
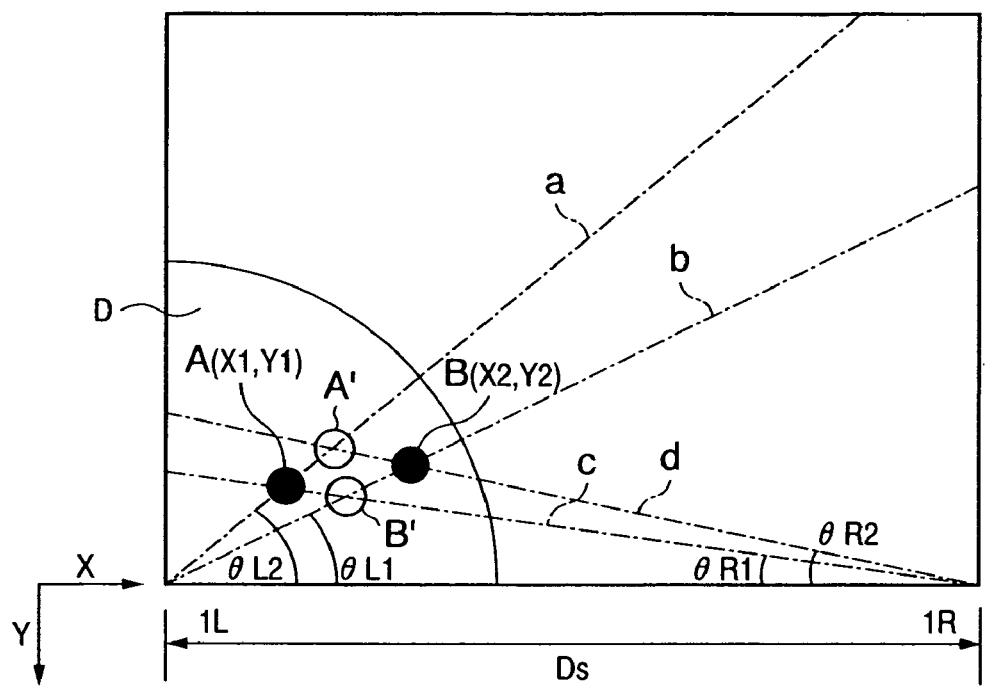
FIGS. 25A and 25B are views for explaining the process for associating shades and pen IDs when an undetectable region of the sensor unit is present.
Figure 25B:
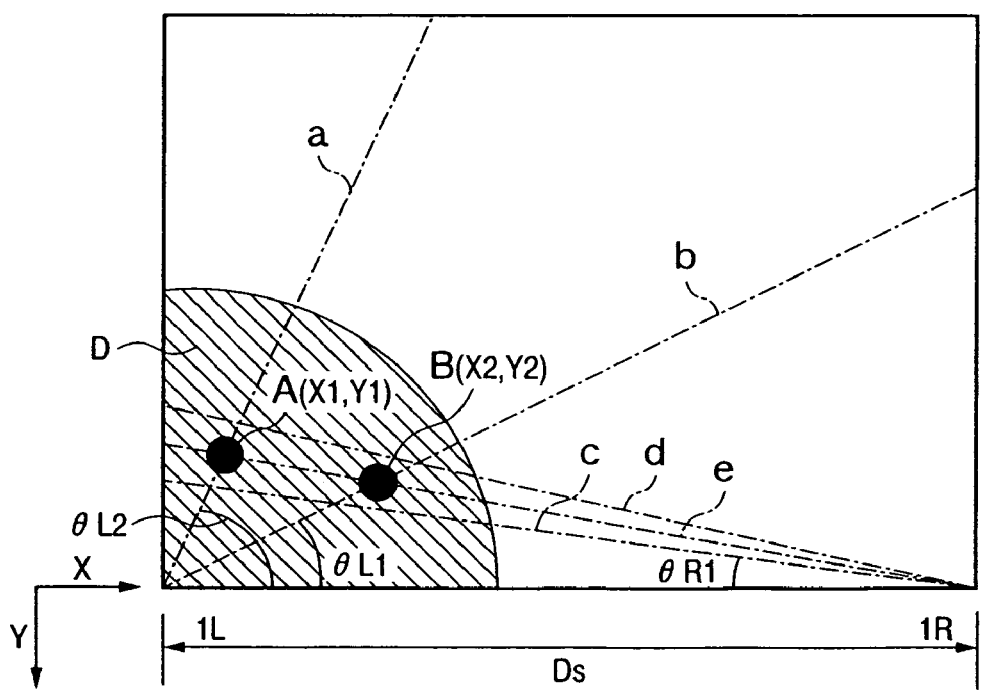

In FIGS. 25A and 25B, assume that a region D is an undetectable region of the sensor unit 1L. Even in this case, the ID information of the pointing device can be assigned to the coordinate value by executing the correspondence determination process between the shade and optical signal of the pointing device as long as the two sensor units do not have an overlapping undetectable region.

As shown in FIG. 25A, when both of a plurality of input points A and B exist in the undetectable region D, the waveform detected by the CCD is as shown in (3) in FIG. 23. Shades in (3)(a) in FIG. 23 can be determined in the same manner as in the above example. Furthermore, a shade width is also detected. The shade width can be easily calculated from leading edge information and trailing edge information, and whether or not an input exists in the undetectable region D can be determined using this shade width information.

Assuming that it is determined that shade widths ΔNL1 and ΔNL2 exist in the undetectable region since they exceed a predetermined width, it can be determined that the undetectable region is present near the sensor unit 1L. In this case, the CCD read process of an optical signal for the control signal of the pointing device is skipped, and an operation for reading a CCD detection signal based on a pen control signal is executed while turning off illumination only on the unit 1R side. In this manner, the read time can be shortened, thus speeding up the process.

Since a shade QR1 is associated with control signal light PR1, if ΔNL1>ΔNL2, the shade QR1 is closer to the unit 1L. Hence, the unit 1R can associate the shade QR1 with a shallower angle with a shade QL1, i.e., it associates the shade QL1 with the pen ID of the control signal light PR1.

When the input positions nearly line up within the control signal light undetectable region D when viewed from the unit 1R, as shown in FIG. 25B, it is determined based on shade widths in (4)(a) in FIG. 23 that they exist in the undetectable region. Since control signal light PR1 detected on the unit 1R side is an input point closer to the unit 1R, it is determined that a shade with a shallower angle corresponds to PR1 when viewed from the unit 1L side. Therefore, it is determined that a shade QL1 in (4)(a) in FIG. 23 corresponds to PR1.

In this way, since the shade and ID information of the pointing device can be associated with each other, ID information of the pointing device can be assigned to each of a plurality of coordinate values, and can be transmitted to the host computer 6.

Figure 26:
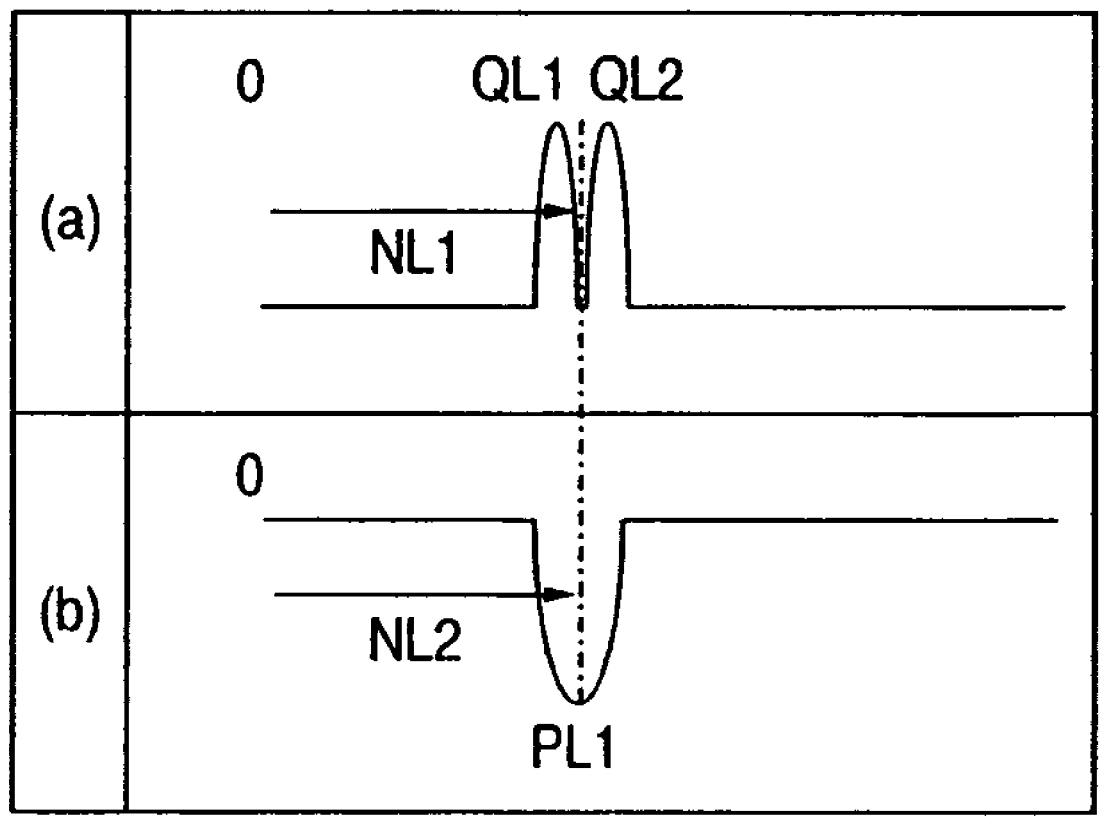
FIG. 26 is a view showing an example of CCD detection waveforms influenced by light reflected by the pointing devices.

In a coordinate input apparatus of this type using light, a phenomenon that projected light is reflected by the pointing device and directly returns to the sensor unit (direct reflection) may occur. Such phenomenon occurs in a surface state in which the paint of the pointing device is formed of a material with high reflectance, and a CCD detection waveform shown in FIG. 26 is obtained. In this case, when the leading and trailing edges of a shade in (a) of FIG. 26 are merely detected, it is determined as if two shades QL1 and QL2 existed. However, by associating with the detection light of the pen control signal, since only one detection light of the pen control signal is detected, as shown in (b) of FIG. 26, it is determined that the shade includes light directly reflected by the pen. Therefore, even when direct reflection of the pointing device occurs, detection errors can be prevented.

Also, when the number of pointing devices that can be used is limited, e.g., when two pointing devices are permitted, if the number of shades is three, it is determined that direct reflection is included. Even in this case, by associating the shades with the detection light of the pen control signals, a shade caused by direct reflection can be determined.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-207607 filed on Jul. 14, 2004, the entire contents of which are hereby incorporated by reference herein.

What is claimed is:

1. A coordinate input apparatus comprising:
a photo transmission/reception unit having a phototransmitter which projects light along a plane of an input region, and a photoreceptor which detects incoming light, said photoreceptor being controlled by control signals to have detection periods during which the incoming light is detected;
a reflector which is arranged on a rim portion of the input region, and configured to reflect incident light from the phototransmitter in said photo transmission/reception unit toward the photoreceptor in that photo transmission/reception unit;
a pointing device including a transmission unit configured to transmit an optical signal including information regarding a unique identifier based on a pointing operation, and used to make the pointing operation for pointing to an arbitrary position in the input region;
a detection unit configured to detect a shade formed by the pointing operation of said pointing device and the optical signal that is transmitted from the transmission unit based on the pointing operation, using said photo transmission/reception unit; and
an output unit configured
  to detect the optical signal that is transmitted from the transmission unit based on the pointing operation, when the detection unit detects a plurality of shades in a single detection period,
  to determine which one of the plurality of shades corresponds to the optical signal, in accordance with the positions of the plurality of shades and a position at which the optical signal is detected,
  to calculate a coordinate value of the position on the basis of the determined one of the plurality of shades corresponding to the optical signal, and
  to append the identifier included in the optical signal to the coordinate value calculated on the basis of the determined one of the plurality of shades.

2. The apparatus according to claim 1, wherein said output unit calculates a plurality of coordinate values of plurality of shades when said detection unit detects the plurality of shades.

3. The apparatus according to claim 2, wherein said output unit skips a calculation of the coordinate value for the shade for which no corresponding optical signal is detected.

4. A method of controlling a coordinate input apparatus which has a photo transmission/reception unit having a phototransmitter which projects light along a plane of an input region, and a photoreceptor which detects incoming light and is controlled by control signals to have detection periods during which the incoming light is detected, a reflector which is arranged on a rim portion of the input region, and configured to reflect incident light from the phototransmitter in the photo transmission/reception unit toward the photoreceptor in that photo transmission/reception unit, and a pointing device which includes a transmission unit configured to transmit an optical signal including information regarding a unique identifier based on a pointing operation and is used to make a pointing operation for to pointing an arbitrary position in the input region, the method comprising the steps of:
detecting a shade formed by the pointing operation of the pointing device using the photo transmission/reception unit;
detecting using the photoreceptor the optical signal transmitted from the transmission unit based on the pointing operation when a plurality of shades are detected in a single detection period;
determining which one of the plurality of shades corresponds to the optical signal, in accordance with position of the plurality of shades and a position at which the optical signal is detected;
calculating a coordinate value of the position on the basis of the determined one of the plurality of shades corresponding to the optical signal; and
appending the identifier included in the optical signal to the coordinate value calculated on the basis of the determined one of the plurality of shades.

5. A coordinate input apparatus comprising:
a pointing device used for a pointing operation and including a transmission unit configured to transmit based on the pointing operation an optical signal including an identifier of the pointing device;

reception means for receiving incoming light, said reception means being controlled by control signals to have detection periods for detecting the incoming light;

first detection means for detecting based on said reception means of a shade formed by the pointing operation device;

second detection means for detecting based on said reception means the optical signal transmitted by the pointing of the pointing device when said first detection means detects a plurality of shades in a single detection period;

determining means for determining which one of a plurality of shades corresponds to the optical signal, in accordance with the positions of the plurality of shades and a position at which the optical signal is detected;

calculating means for calculating position information on the basis of the determined one of the plurality of shades corresponding to the optical signal; and association means for associating the identifier of the pointing device included in the optical signal with the position information corresponding to the determined one of the plurality of shades corresponding to the optical signal.

6. The apparatus according to claim 1, further comprising a display device overlaid on the input region.

7. The apparatus according to claim 1, wherein said output unit turns off the phototransmitter and detects the optical signal, and when the phototransmitter is turned on said detection unit detects the shade.

8. The method according to claim 4, wherein said shade detecting step turns on the phototransmitter and detects the shade, and said optical signal detecting step turns off the phototransmitter and detects the optical signal when the plurality of shades are detected in said shade detecting step.

9. The apparatus according to claim 5, wherein said first detection means detects turns on a phototransmitter for lighting an input area and detects the shade, and said second detection means turns off the phototransmitter and detects the optical signal when said first detection unit means detects the plurality of shades.

* * * * *